(12) United States Patent
Tomeba et al.

(10) Patent No.: US 10,841,811 B2
(45) Date of Patent: Nov. 17, 2020

(54) BASE STATION APPARATUS, TERMINAL APPARATUS, AND COMMUNICATION METHOD

(71) Applicants: SHARP KABUSHIKI KAISHA, Sakai, Osaka (JP); FG INNOVATION COMPANY LIMITED, Tuen Mun, New Territories (HK)

(72) Inventors: Hiromichi Tomeba, Sakai (JP); Ryota Yamada, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/313,260

(22) PCT Filed: Jun. 22, 2017

(86) PCT No.: PCT/JP2017/022962
§ 371 (c)(1),
(2) Date: Dec. 26, 2018

(87) PCT Pub. No.: WO2018/008404
PCT Pub. Date: Jan. 11, 2018

(65) Prior Publication Data
US 2019/0159042 A1    May 23, 2019

(30) Foreign Application Priority Data
Jul. 5, 2016    (JP) ................................ 2016-133248

(51) Int. Cl.
*H04W 4/00* (2018.01)
*H04W 16/28* (2009.01)
(Continued)

(52) U.S. Cl.
CPC .............. *H04W 16/28* (2013.01); *H04B 7/06* (2013.01); *H04B 7/0617* (2013.01);
(Continued)

(58) Field of Classification Search
None
See application file for complete search history.

(56) References Cited

U.S. PATENT DOCUMENTS 10,461,877 B2 * 10/2019 Han ...................... H04L 5/0094
2010/0195614 A1 *  8/2010 Nimbalker ........ H04W 72/1289
                                                    370/330
(Continued)

FOREIGN PATENT DOCUMENTS

JP    2012-034366 A    2/2012
WO    2016/040290 A1   3/2016

OTHER PUBLICATIONS

Huawei, Hisilicon, "Synchronization Signal Design", 3GPP TSG RAN WG1 Meeting #82 bis R1-155960, Malmo, Sweden, Oct. 5-9, 2015.

(Continued)

*Primary Examiner* — Elisabeth Benoit Magloire
(74) *Attorney, Agent, or Firm* — ScienBiziP, P.C.

(57) ABSTRACT

A base station apparatus, a terminal apparatus, and a communication method are provided that achieve a radio access network in which beam sweeping is appropriately performed in an environment in which a plurality of frame formats are used in a multiplexed fashion. The base station apparatus according to the present invention includes an antenna unit for which a plurality of beam patterns is configurable, a frame configuration unit capable of configuring a plurality of frame configurations; and a beam sweeping unit configured to perform beam sweeping based on a prescribed frame configuration in a case that a frame configuration configured by the frame configuration unit is the prescribed frame configuration.

6 Claims, 11 Drawing Sheets

(51) Int. Cl.
*H04B 7/06* (2006.01)
*H04L 5/00* (2006.01)
*H04L 25/02* (2006.01)
*H04W 56/00* (2009.01)
*H04W 72/04* (2009.01)

(52) U.S. Cl.
CPC ......... *H04B 7/0626* (2013.01); *H04L 5/0048* (2013.01); *H04L 25/0226* (2013.01); *H04W 56/001* (2013.01); *H04W 72/046* (2013.01); *H04W 72/0446* (2013.01); *H04W 72/0453* (2013.01)

(56) References Cited

U.S. PATENT DOCUMENTS

| | | | |
|---|---|---|---|
| 2016/0242083 A1* | 8/2016 | Guan | H04W 36/0085 |
| 2016/0286506 A1* | 9/2016 | Chae | H04W 56/002 |
| 2019/0159042 A1* | 5/2019 | Tomeba | H04L 5/0007 |
| 2019/0222288 A1* | 7/2019 | Zhou | H04B 7/0408 |

OTHER PUBLICATIONS

Intel Corporation, "On Downlink HARQ-ACK feedback for NB-IoT", 3GPP TSG RAN WG1 NB-IoT Ad-Hoc Meeting, R1-160133, Budapest, Hungary, Jan. 18-20, 2016.
Huawei, Hisilicon, "Frame structure design considerations for bands above 6 GHz", 3GPP TSG RAN WG1 Meeting #85, R1-164380, Nanjing, China, May 23-27, 2016.
"IMT Vision—Framework and overall objectives of the future development of IMT for 2020 and beyond," Recommendation ITU-R M. 2083-0, Sep. 2015.
Nokia, Alcatel-Lucent Shanghai Bell, "Main components for forward compatible frame structure design in NR", 3GPP TSG-RAN WG1 #85 R1-165029, Nanjing, P.R. China, May 23-27, 2016.
Huawei, Hisilicon, "Discussion on frame structure for NR", 3GPP TSG RAN WG1 Meeting #85 R1-164032, Nanjing, China, May 23-27, 2016.

* cited by examiner

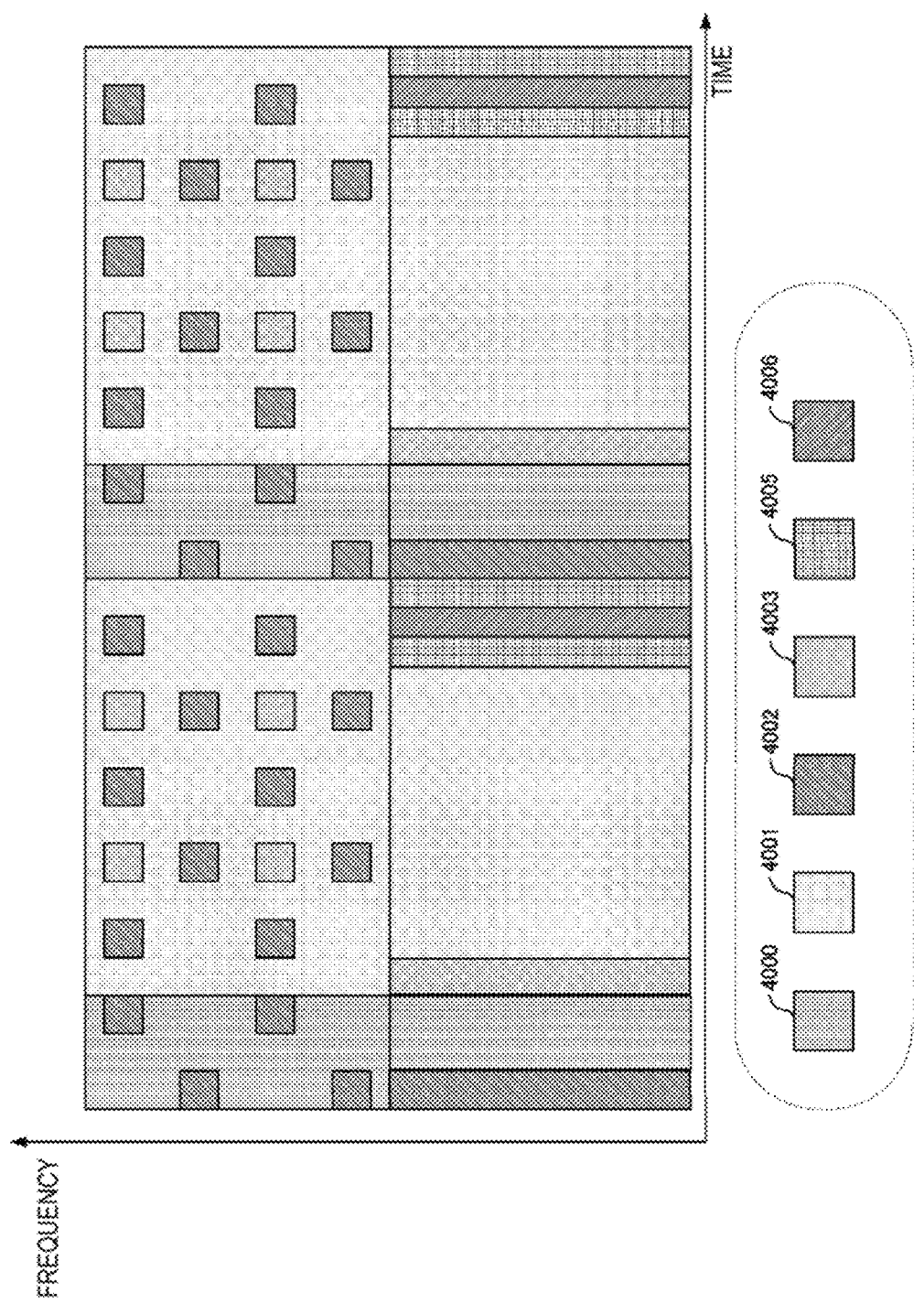

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In a communication system such as Long Term Evolution (LTE) or LTE-Advanced (LTE-A) standardized by the Third Generation Partnership Project (3GPP), the communication area can be widened by forming a cellular configuration in which multiple areas, covered by base station apparatuses (base stations, transmission stations, transmission points, downlink transmission devices, uplink reception devices, a group of transmit antennas, a group of transmit antenna ports, component carriers, eNodeB, Access Point, and AP) or transmission stations equivalent to the base station apparatuses, are deployed in the form of multiple cells (Cells) being linked together. A terminal apparatus (reception station, reception point, downlink reception apparatus, uplink transmission apparatus, receive antenna group, receive antenna port group, UE, station, and STA) is connected to the base station. In such a cellular configuration, frequency efficiency can be improved by using the same frequency among neighboring cells or sectors.

In LTE/LTE-A, frame formats are defined for frequency division duplex, time division duplex, and licensed assisted access, respectively. For example, the base station apparatus and the terminal apparatus of LTE/LTE-A using frequency division duplex can always perform communication using a common frame format regardless of a communication bandwidth or the like.

Research and development activities related to the 5th generation mobile radio communication system (5G system) have been actively carried out, aiming to start commercial services around the year 2020. A vision for standard system for the 5G system (International mobile telecommunication—2020 and beyond: IMT-2020) was recently recommended (see NPL 1) by the International Telecommunication Union Radio Communications Sector (ITU-R), which is an international standardization body.

The 5G system assumes that a radio access network is operated by combining various frequency bands to satisfy various requirements represented by three large use scenarios (Enhanced mobile broadband (EMBB), Enhanced Massive machine type communication (eMTC), and Ultra-reliable and low latency communication (URLLC)). Therefore, in the 5G system, unlike the conventional LTE/LTE-A, it is assumed that a different frame format is multiplexed for use even for the same access method.

At the same time, frequency bands expected to be utilized in the 5G system includes a frequency band which is a high frequency band of 6 GHz or higher. In the high frequency band, the degradation of the reception quality due to the propagation loss is too large to be ignored. Since there is a limitation in increasing the transmission power, it is assumed that beamforming using a plurality of antenna elements becomes indispensable in the high frequency band. Also, in the beamforming, it is not enough to have directivity in the antenna pattern, and beam sweeping is indispensable that directs the main beam of the antenna pattern in a desired direction.

CITATION LIST

Non Patent Literature

NPL 1: "IMT Vision—Framework and overall objectives of the future development of IMT for 2020 and beyond," Recommendation ITU-R M. 2083-0, September 2015.

SUMMARY OF INVENTION

Technical Problem

However, in the 5G system in which it is assumed that a plurality of frame formats are multiplexed for use, since the symbol length varies for each frame format, the beam sweeping may not be accurately performed. This suggests that the communication capacity in the high frequency band is significantly degraded.

The present invention has been made in light of such circumstances, and an object thereof is to provide a base station apparatus, a terminal apparatus, and a communication method that achieve a radio access network in which beam sweeping is appropriately performed in an environment in which a plurality of frame formats are multiplexed for use.

Solution to Problem

To address the above-mentioned problems, a base station apparatus, a terminal apparatus, and a communication method according to an aspect of the present invention are configured as follows.

(1) Namely, the base station apparatus according to an aspect of the present invention includes an antenna unit configured to have a plurality of beam patterns configurable, a frame configuration unit configured to configure a plurality of frame configurations; and a beam sweeping unit configured to perform beam sweeping based on a prescribed frame configuration in a case that one of the plurality of frame configurations configured by the frame configuration unit is the prescribed frame configuration.

(2) In addition, the base station apparatus according to an aspect of the invention is a base station apparatus described in the above section (1), wherein the base station apparatus performs signaling of information for indicating the prescribed frame configuration to the terminal apparatus.

(3) In addition, the base station apparatus according to an aspect of the invention is a base station apparatus described in the above section (1), wherein the beam sweeping unit is capable of performing the beam sweeping within a prescribed time period, and the beam sweeping unit determines a number of beam patterns to be scanned within the prescribed time period based on the one of the plurality of frame configurations.

(4) In addition, the base station apparatus according to an aspect of the invention is a base station apparatus described in the above section (3), wherein the plurality of frame configurations includes a first frame configuration and a second frame configuration, each of which has a subcarrier interval different from each other, the subcarrier interval of the first frame configuration is larger than the subcarrier interval of the second frame configuration, and in a case that the frame configuration unit configures the first frame configuration, the beam sweeping unit scans, within the prescribed time period, a same or larger number of beam patterns compared with a case in which the frame configuration unit configures the second frame configuration.

(5) In addition, the terminal apparatus according to an aspect of the invention is a terminal apparatus for communicating with a base station apparatus, the terminal apparatus including a receiver configured to receive a signal transmitted from the base station apparatus; and a frame interpretation unit configured to interpret a plurality of frame configurations, wherein a beam detection operation is performed in a case that a frame configuration of the signal received by the receiver is a prescribed frame configuration.

(6) In addition, the terminal apparatus according to an aspect of the invention is a terminal apparatus described in the above section (5), wherein the receiver receives information for indicating the prescribed frame configuration.

(7) In addition, the terminal apparatus according to an aspect of the invention is a terminal apparatus described in the above section (5), wherein the beam detection operation is performed for each of the plurality of frame configurations.

(8) In addition, the terminal apparatus according to an aspect of the invention is a terminal apparatus described in the above section (5), wherein the number of beam patterns scanned by the beam detection operation within a prescribed time period is determined based on the frame configuration.

(9) In addition, the terminal apparatus according to an aspect of the invention is a terminal apparatus described in the above section (8), wherein the plurality of frame configurations include a first frame configuration and a second frame configuration, each of which has a subcarrier interval different from each other, the subcarrier interval of the first frame configuration is larger than the subcarrier interval of the second frame configuration, and in a case that the frame interpretation unit interprets that the signal received by the receiver has the first frame configuration, the terminal apparatus scans, within the prescribed time period, a same or larger number of beam patterns compared with a case in which the frame interpretation unit interprets that the signal received by the receiver has the second frame configuration.

(10) In addition, the communication method according to an aspect of the invention is the communication method of a base station apparatus for communicating with a terminal apparatus, the communication method including the steps of: configuring one of a plurality of beam patterns, configuring one of a plurality of frame configurations, and performing a beam sweeping based on a prescribed frame configuration in a case that the prescribed frame configuration is configured.

Advantageous Effects of Invention

The present invention enables the communication quality of the communication system to be greatly improved, because a radio access network is achieved that allows beam sweeping to be appropriately performed in an environment in which a plurality of frame formats are multiplexed for use.

BRIEF DESCRIPTION OF DRAWINGS

FIG. 11 is a diagram illustrating an example of a frame format according to an aspect of the present invention.

DESCRIPTION OF EMBODIMENTS

A communication system according to the present embodiment includes a base station apparatus (a transmission device, cells, a transmission point, a group of transmit antennas, a group of transmit antenna ports, component carriers, eNodeB, an access point, AP, a wireless router, a relay, and a communication device) and a terminal apparatus (a terminal, a mobile terminal, a reception point, a reception terminal, a receiver, a group of receive antennas, a group of receive antenna ports, a UE, a station, and STA).

According to the present embodiment, "X/Y" includes the meaning of "X or Y". According to the present embodiment, "X/Y" includes the meaning of "X and Y". According to the present embodiment, "X/Y" includes the meaning of "X and/or Y".

1. First Embodiment

Figure 1:
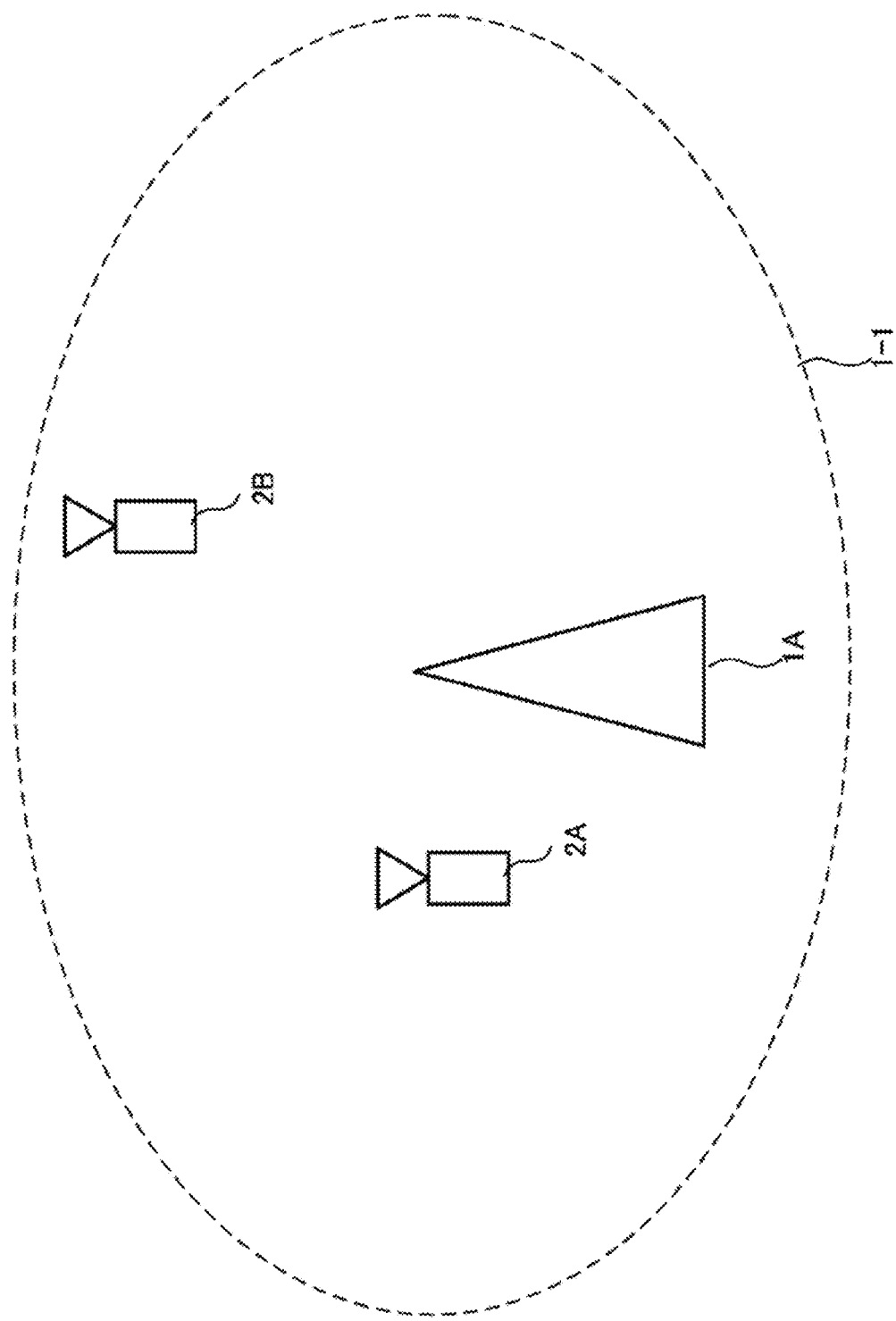
FIG. 1 is a diagram illustrating an example of a communication system according to an aspect of the present invention.

FIG. 1 is a diagram illustrating an example of a communication system according to the present embodiment. As illustrated in FIG. 1, the communication system according to the present embodiment includes a base station apparatus 1A (simply referred to as a base station apparatus 1) and terminal apparatuses 2A and 2B. Coverage 1-1 is a range (a communication area) in which the base station apparatus 1A can connect to the terminal apparatuses. Note that the communication system according to the present embodiment can include a plurality of base station apparatuses (for example, the base station apparatus 1B) and three or more terminal apparatuses.

With respect to FIG. 1, the following uplink physical channels are used for uplink radio communication from the terminal apparatus 2 to the base station apparatus 1A. The uplink physical channels are used for transmitting information output from a higher layer.

Physical uplink control channel (PUCCH)
Physical uplink shared channel (PUSCH)
Physical random access channel (PRACH)

The PUCCH is used to transmit uplink control information (UCI). The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared CHannel (UL-SCH) resource. The Channel State Information refers to a Rank Indicator (RI) for specifying a suited number of spatial multiplexing, a Precoding Matrix Indicator (PMI) for specifying a suited precoder, a Channel Quality Indicator (CQI) for specifying a suited transmission rate, and the like.

The Channel Quality Indicator (hereinafter, referred to as a CQI value) can be a modulation scheme (for example, QPSK, 16QAM, 64QAM, 256QAM, or the like) and a coding rate suited in a prescribed band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator are collectively referred to as CSI values.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the Uplink Control Information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a DeModulation Reference Signal (DMRS) and a Sounding Reference Signal (SRS).

The DMRS is associated with transmission of the PUSCH or the PUCCH. For example, the base station apparatus 1A uses DMRS in order to perform channel compensation of PUSCH or PUCCH. The SRS is not associated with the transmission of the PUSCH or the PUCCH. For example, the base station apparatus 1A uses SRS to measure an uplink channel state. The base station apparatus 1A may notify the configuration information of the SRS in the upper layer signaling or the DCI format described later. The base station apparatus 1A may notify the configuration information of the DMRS in the upper layer signaling or the DCI format described later.

Multiple methods to trigger the SRS may be defined. For example, in the trigger type 0 the signaling of the upper layer is the trigger, and in the trigger type 1 the downlink control information, described later, is the trigger.

The SRS includes a cell specific SRS (Common SRS) and a UE specific SRS (Dedicated SRS). The UE-specific SRS includes a periodically transmitted SRS (UE-specific periodic SRS) and an SRS transmitted aperiodically based on a trigger (UE-specific aperiodic SRS).

A transmission bandwidth (srs-BandwidthConfig) of a Common SRS and a subframe in which the Common SRS is transmitted (srs-SubframeConfig) are designated by upper layer signaling or downlink control information described later. In addition, the Commmon SRS is not transmitted in a subframe that includes a PUCCH including at least one of a HARQ-ACK or a SR in a case that a prescribed parameter (for example, ackNackSRS-Simultaneous Transmission) is False. On the contrary, the Commmon SRS may be transmitted in a subframe that includes a PUCCH including at least one of a HARQ-ACK or a SR in a case that a prescribed parameter (for example, ackNackSRS-Simultaneous Transmission) is True.

For the Dedicated SRS, a transmission bandwidth, a hopping bandwidth (srs-HoppingBandwidth), a frequency allocation start position (freqDomainPosition), a transmission duration (Duration) (Single transmission or indefinite transmission), a transmission cycle (srs-ConfigIndex), a cyclic shift amount (cyclicShift) given to the SRS signal sequence, and a position of the SRS formed on the comb teeth (transmissionComb) are respectively configured by upper layer signaling or downlink control information described later.

The SRS can be transmitted from a plurality of antenna ports. The number of antenna ports for the transmission is configured by the upper layer signaling. A UE which is configured to transmit a SRS from a plurality of antenna ports shall transmit, to the serving cell, the SRS from all of the configured transmission antenna ports by using a single SC-FDMA symbol of the same subframe. In this case, the same transmission bandwidth and the frequency allocation start position are configured for all of the SRSs transmitted from the configured transmission antenna ports.

A UE in which multiple Transmission advance groups (TAGs) are not configured shall not transmit a SRS unless the SRS and a PUSCH overlap each other in the same symbol.

In a case that one SC-FDMA symbol is included in the UpPTS of a serving cell for the serving cell of the TDD, the UE may use the SC-FDMA symbol to transmit the SRS. In a case that two SC-FDMA symbols are included in the UpPTS of the serving cell, the UE may use both of the two SC-FDMA symbols to transmit the SRS. In addition, for the SRS of the trigger type 0, the SRS may be configured in both of the two SC-FDMA symbols for the same UE.

In FIG. 1, for example, the following downlink physical channels are used for the downlink radio communication from the base station apparatus 1A to the terminal apparatus 2A. The downlink physical channels are used for transmitting information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

PBCH is used for broadcasting a Master Information Block (MIB, a Broadcast CHannel (BCH)) that is shared by the terminal apparatuses. PCFICH is used for transmission of information indicating a region (e.g., the number of OFDM symbols) to be used for transmission of PDCCH.

PHICH is used for transmission of ACK/NACK with respect to uplink data (a transport block, a codeword) received by the base station apparatus 1A. In other words, PHICH is used for transmission of a HARQ indicator (HARQ feedback) indicating ACK/NACK with respect to the uplink data. Note that ACK/NACK is also called HARQ-ACK. The terminal apparatus 2A reports the received ACK/NACK to a higher layer. ACK/NACK refers to ACK indicating a successful reception, NACK indicating an unsuccessful reception, and DTX indicating that no corresponding data is present. In a case that PHICH for uplink data is not present, the terminal apparatus 2A reports ACK to a higher layer.

The PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information on the PDSCH resource allocation, information on a Modulation and Coding Scheme (MCS) for the PDSCH, a TPC command for the PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information on the PUSCH resource allocation, information on a MCS for the PUSCH, a TPC command for the PUSCH, and the like. Here, the DCI format for the uplink is also referred to as uplink grant (or uplink assignment).

Further, the DCI format for uplink may be used for requesting (CSI request) downlink channel state information (CSI, also referred to as reception quality information). The Channel State Information refers to the Rank Indicator (RI) for specifying a suited number of spatial multiplexing, the Precoding Matrix Indicator (PMI) for specifying a suited precoder, the Channel Quality Indicator (CQI) for specifying a suited transmission rate, a Precoding Type Indicator (PTI), and the like.

The DCI format for the uplink can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (aperiodic CSI). The CSI feedback report can be used for a mode configuration (CSI report mode) to aperiodically report the Channel State Information. The base station apparatus can configure any one of the periodic CSI feedback report and the aperiodic CSI feedback report. In addition, the base station apparatus can configure both the periodic CSI feedback report and the aperiodic CSI feedback report.

The DCI format for the uplink can be used for a configuration indicating a type of the CSI feedback report that is fed back to the base station apparatus by the terminal apparatus. The types of the CSI feedback report include wideband CSI (for example, Wideband CQI), narrowband CSI (for example, Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information of the scheduled PUSCH.

PDSCH is used for transmission of downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific information (unique to user equipment) is transmitted using a message dedicated to the given terminal apparatus. PDSCH is used for transmission of MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

The types of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a DownLink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS), a DeModulation Reference Signal (DMRS), a Non-Zero Power Chanel State Information—Reference Signal (NZP CSI-RS), and a Zero Power Chanel State Information—Reference Signal (ZP CSI-RS).

CRS is transmitted in all bands of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. The terminal apparatus 2A performs signal measurement (channel measurement), using NZP CSI-RS. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing is performed for each codeword.

Also, the base station apparatus can integrate a plurality of component carriers (CC) for a broader band transmission to communicate with a terminal apparatus that supports carrier aggregation (CA). In the carrier aggregation, one primary cell (PCell) and one or more secondary cells (SCell) are configured as an aggregation of serving cells.

In dual connectivity (DC), a master cell group (MCG) and a secondary cell group (SCG) are configured as groups of serving cells. The MCG includes a PCell and optionally one or more SCells. In addition, the SCG includes a primary SCell (PSCell) and optionally one or more SCells.

Figure 2:
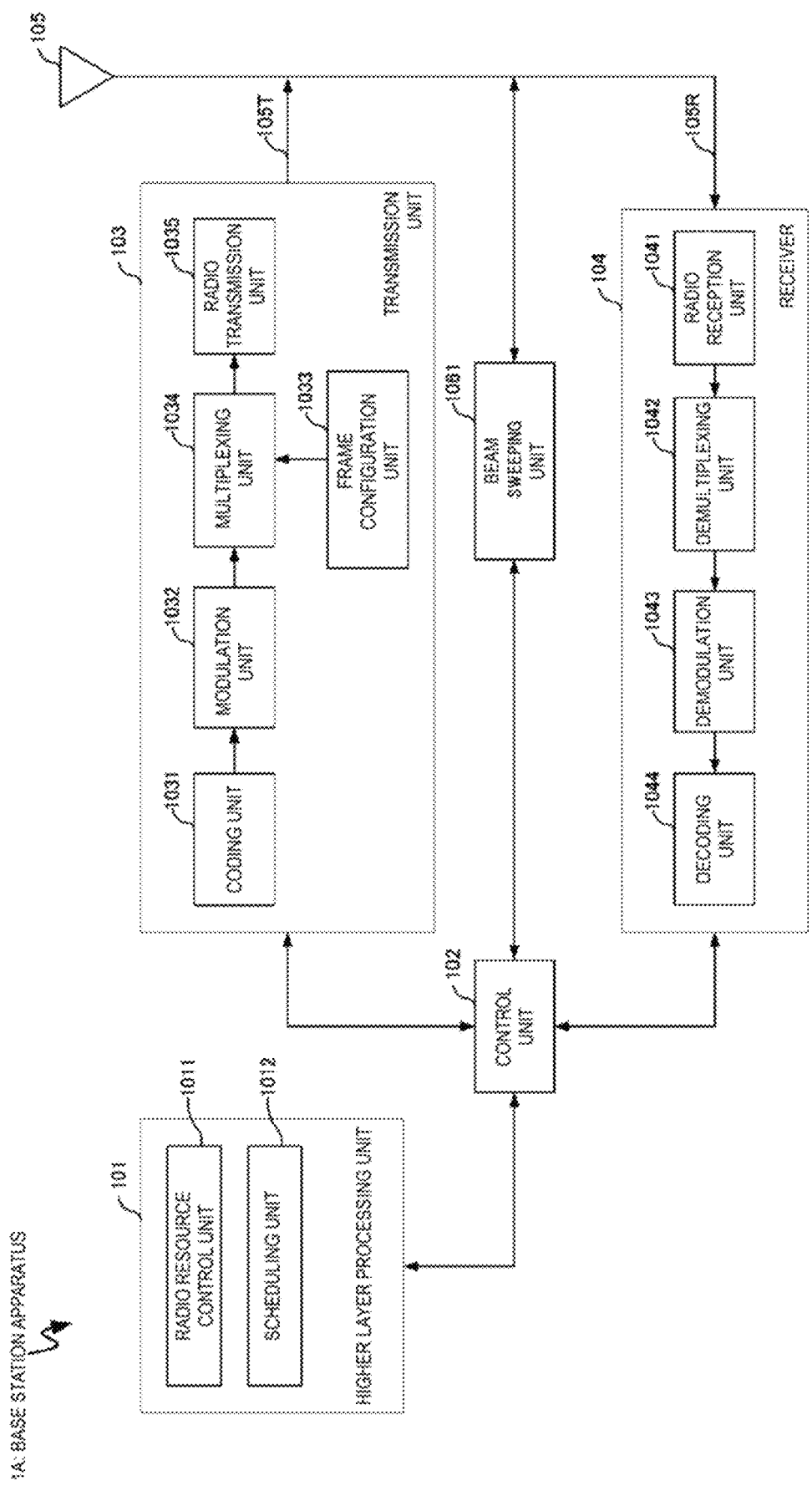
FIG. 2 is a block diagram illustrating an example of a configuration of a base station apparatus according to an aspect of the present invention.

FIG. 2 is a schematic block diagram illustrating a configuration of the base station apparatus 1A according to the present embodiment. As illustrated in FIG. 2, the base station apparatus 1A is configured to include a higher layer processing unit (higher layer processing step) 101, a controller (controlling step) 102, a transmitter (transmitting step) 103, a receiver (receiving step) 104, an antenna (an antenna unit) 105 and a beam sweeping unit (beam sweeping step) 1061. The higher layer processing unit 101 is configured, including a radio resource control unit (radio resource controlling step) 1011 and a scheduling unit (scheduling step) 1012. The transmitter 103 is configured to include a coding unit (coding step) 1031, a modulating unit (modulating step) 1032, a frame configuration unit (frame configuration step) 1033, a multiplexing unit (multiplexing step) 1034, and a radio transmitting unit (radio transmitting step) 1035. The receiver 104 is configured, including a radio reception unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information on a terminal apparatus, such as a function of the terminal apparatus (UE capability, function information) or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the stated terminal apparatus transmits information (parameters) indicating whether the prescribed function is supported. In a case where a terminal apparatus does not support a prescribed function, the stated terminal apparatus does not transmit information (parameters) indicating whether the prescribed function is supported. In other words, whether the prescribed function is supported is reported based on whether information (parameters) indicating whether the prescribed function is supported is transmitted. Information (parameters) indicating whether a prescribed function is supported may be reported using one bit of 1 or 0.

The radio resource control unit 1011 generates, or acquires from a higher node, the downlink data (the transport block) allocated to the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (the PDSCH and the PUSCH) are allocated, a coding rate and a modulation scheme (or MCS) for the physical channels (the PDSCH and the PUSCH), the transmit power, and the like. The scheduling unit 1012 outputs the determined information to the controller 102.

The scheduling unit 1012 generates the information to be used for the scheduling of the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling of the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes the PHICH, the PDCCH, the EPDCCH, the PDSCH, and the downlink reference signal, and transmits the signal to the terminal apparatus 2 through the antenna 105.

The coding unit 1031 codes the HARQ indicator, the downlink control information, and the downlink data that are input from the higher layer processing unit 101, in compliance with the coding scheme prescribed in advance, such as block coding, convolutional coding, or turbo coding, or in compliance with the coding scheme determined by the radio resource control unit 1011. The modulating unit 1032 modulates the coded bits input from the coding unit 1031, in compliance with the modulation scheme prescribed in advance, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 2011.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements. It is to be noted that the downlink reference signal is generated by the transmitter 103 in accordance with a sequence, known to the terminal apparatus 2A, which can be obtained with a prescribed rule based on a physical cell identifier (PCI, cell ID) or the like for identifying the base station apparatus 1A.

The frame configuration unit 1033 provides the frame configuration (frame format, frame architecture, frame structure) of the transmission signal generated by the transmitter 103. The operation of the frame configuration unit 1033 will be described later. In the following description, it is assumed that the transmitter 103 includes the frame configuration unit 1033, but other constituent unit may have the function of the frame configuration unit 1033 described later. For example, the upper layer processing unit 101 may have this function.

The radio transmitting unit 1035 performs Inverse Fast Fourier Transform (IFFT) on the multiplexed modulation symbol and the like to generate an OFDM symbol, attaches a Cyclic Prefix (CP) to the OFDM symbol to generate a baseband digital signal, converts the baseband digital signal into an analog signal, removes unnecessary frequency components through filtering, and performs an output to the antenna 105.

Figure 3:
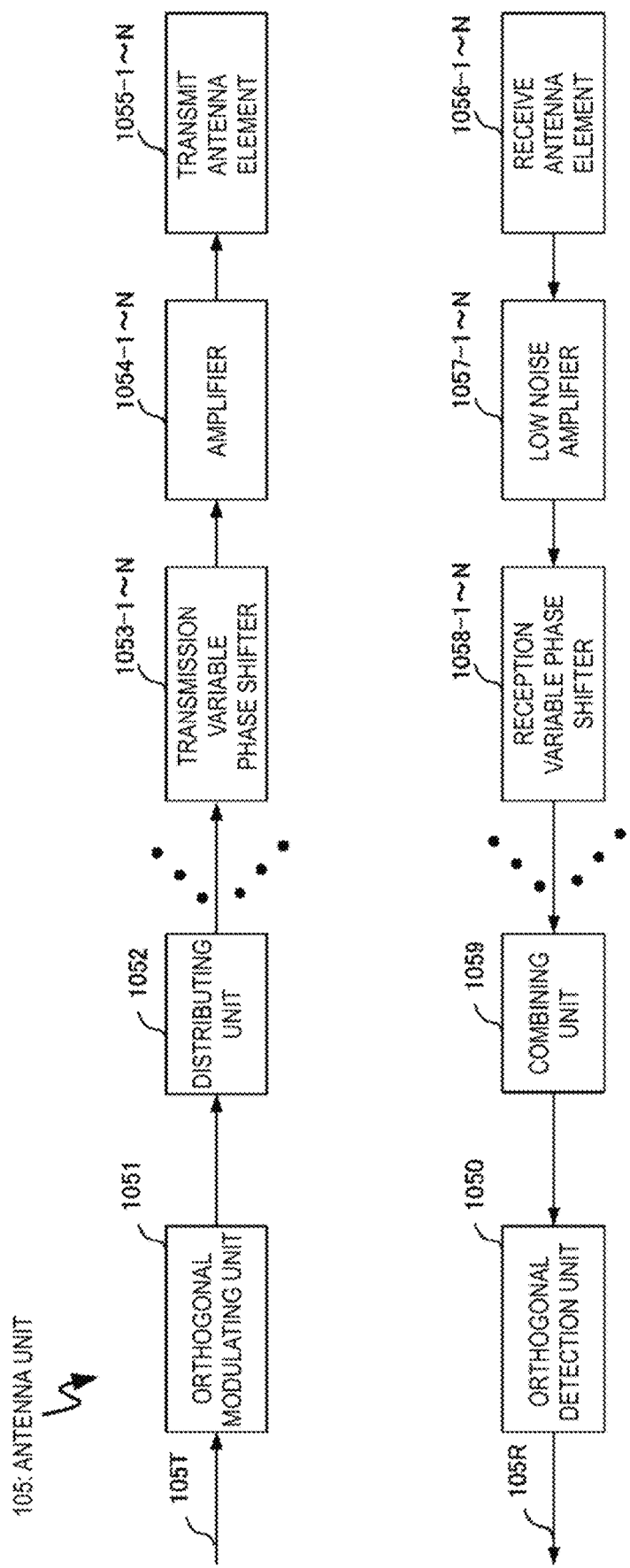
FIG. 3 is a block diagram illustrating an example of a configuration of an antenna according to an aspect of the present invention.

FIG. 3 is a block diagram illustrating an example of a configuration of the antenna 105 according to the present embodiment. As illustrated in FIG. 3, the antenna 105 at least includes an orthogonal modulating unit 1051, a distributing unit 1052, transmission variable phase shifters 1053-1 to 1053-N, amplifiers 1054-1 to 1054-N, transmit antenna elements 1055-1 to 1055-N, receive antenna elements 1056-1 to 1056-N, low noise amplifiers 1057-1 to 1057-N, reception variable phase shifters 1058-1 to 1058-N, a combining unit 1059, and an orthogonal detection unit 1050. Note that the transmission variable phase shifter 1053 and the reception variable phase shifter 1058 may be a common shifter. The transmit antenna elements 1055-1 to 1055-N and the receive antenna elements 1056-1 to 1056-N may be common elements. In the following description, it is assumed that the number of transmitting antenna elements is N and the number of receiving antenna elements is N, but in the method according to this embodiment, the number of N is not limited at all. Naturally, the number of transmitting antenna elements and the number of receiving antenna elements may be different. Note that 105T is an antenna input which is output from the transmitter 103, and 105R is an antenna output which is input to the receiver 104.

The orthogonal modulating unit 1051 up-converts the signal input from the transmitter 103 to a signal of the carrier frequency. The distributing unit 1052 distributes the signal up-converted to the signal of the carrier frequency to each transmit antenna element. The transmission variable phase shifter 1053 and the amplifier 1054 respectively change the phase and amplitude of the signal transmitted from the corresponding transmit antenna element 1055.

In the present embodiment, the number of signal inputs to the orthogonal modulating unit 1051 is defined as the number of inputs to the antenna 105. Generally, in a phase modulation signal such as QPSK, two signals that include an in-phase axis signal (I axis signal) and a quadrature axis signal (Q axis signal) are input to the orthogonal modulating unit 1051. In the present embodiment, an I axis signal and a Q axis signal are collectively counted as one signal. Since the I axis signal and the Q axis signal are generated by a digital/analog converter (DAC) (not illustrated in FIGS. 2 and 3) with respect to baseband signals, the number of DACs can be said to be the number of inputs to the antenna 105. Naturally, for each modulation signal, a DAC is required for the I axis signal and another DAC is required for the Q axis signal. The DAC for the I axis signal and the other DAC for the Q axis signal are collectively counted as one DAC.

Note that the configuration of the antenna 105 according to the present embodiment is not limited to the example in FIG. 3. For example, the orthogonal modulating unit 1051 may be included in the transmitter 103. In this case, the number of outputs of the orthogonal modulating unit 1051 is the number of inputs to the antenna 105. Furthermore, the distributing unit 1052 may also be included in the transmitter 103. In this case, the number of inputs to the antenna 105 is the number of outputs of the distributing unit 1052. However, since the signals output from the distributing unit 1052 are the same, the number of distributing units 1052 will be described as the number of inputs to the antenna 105. Further, the antenna 105 may further include an amplifier between the distributing unit 1052 and the orthogonal modulating unit 1051. Further, the amplifier 1054 of the antenna 105 may be placed anterior to the transmission variable phase shifter 1053.

The beam sweeping unit 1061 according to the present embodiment is capable of controlling the transmission variable phase shifter 1053 and the amplifier 1054. The following description will refer to the case in which a transmit beam control unit 1036 controls the transmission variable phase shifter 1053, however the case in which the transmit beam control unit 1036 controls only the amplifier 1054, and the case in which the transmit beam control unit 1036 controls both the transmission variable phase shifter 1053 and the amplifier 1054 is also included in the present embodiment.

Figure 4:
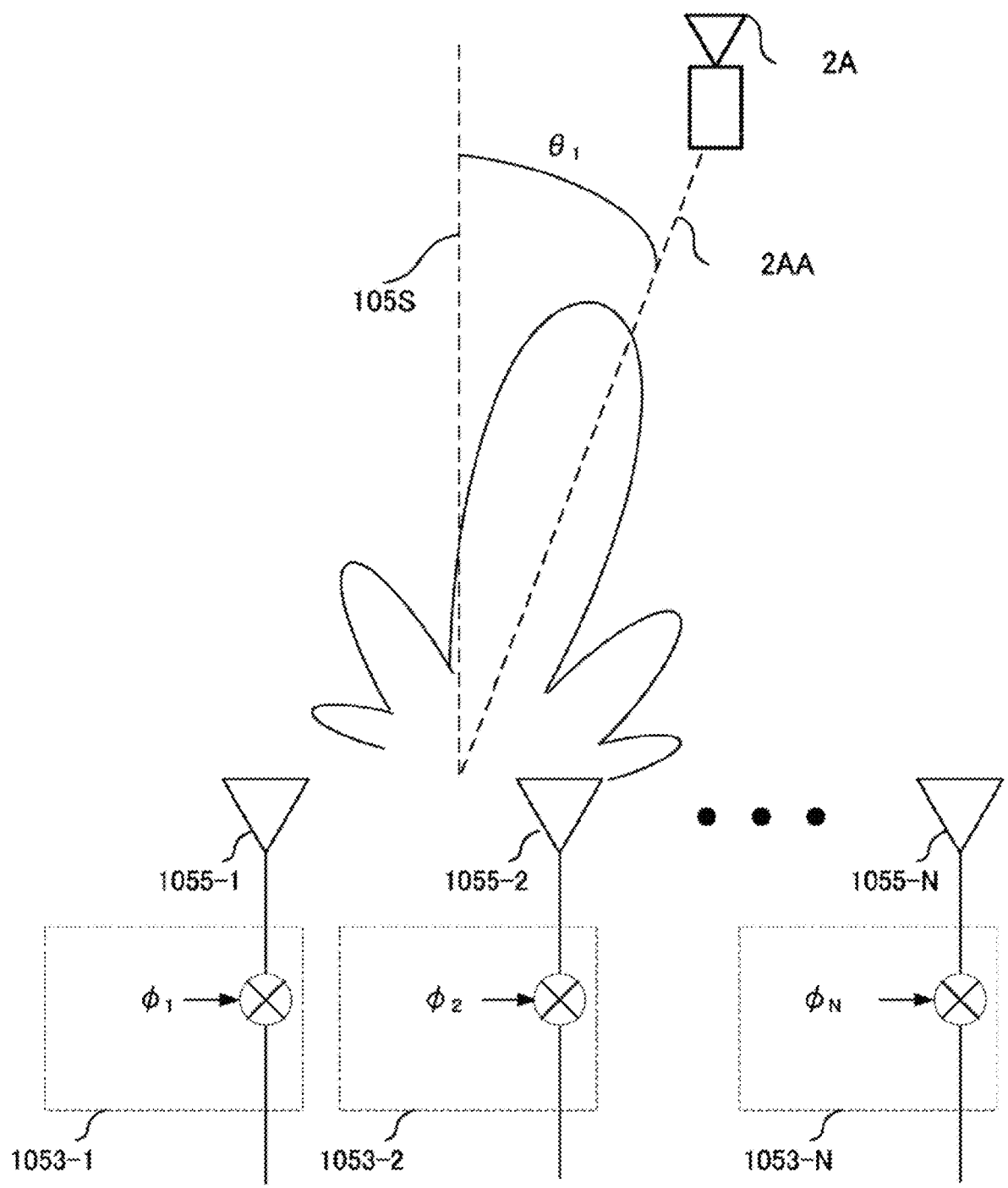
FIG. 4 is a schematic diagram illustrating a state of antenna directivity pattern control according to an aspect of the present invention.

FIG. 4 is a schematic diagram illustrating the principle of forming a beam pattern (antenna directivity pattern). In FIG. 4, it is assumed that the N transmit antenna elements 1055 are equally spaced at the antenna spacing d to form a linear antenna array. In a case that the amount of a phase shift given by the transmission variable phase shifter 1053-$n$ is $\varphi_n$, and that the angle formed by the positional direction 2AA of the terminal apparatus 2A with respect to the radiation direction 105S of the antenna 105 is $\theta_1$, the reception signal of the terminal apparatus 2A is given by Equation (1).

Equation (1)

$$r = \left( \sum_{n=1}^{N} \exp(jknd\sin\theta_1)\exp(j\phi_n) \right) s + \beta \quad (1)$$

Here, reference sign s represents a downlink signal, addressed to the terminal apparatus 2A, which is generated by the transmitter 103 of the base station apparatus 1A, and the average power thereof is P. Also, reference sign $\beta$ represents the noise component of the variance (average power) $\sigma^2$ with an average of 0 observed at the terminal apparatus 2A. Also, reference sign k represents the wave number. Note that, in Equation (1), the influence of multipath fading is not considered. From Equation (1), it can be seen that the average reception signal-to-noise power ratio (SNR) $\gamma_1$ of the received signal of the terminal apparatus 2A is given by Equation (2).

Equation (2)

$$\gamma_1 = \frac{P}{\sigma^2} \left\| \sum_{n=1}^{N} \exp(jknd\sin\theta_1)\exp(j\phi_n) \right\|^2 \quad (2)$$

From Equation (2), it can be seen that the reception SNR is associated with the phase shift amount $\varphi_n$ given by the transmission variable phase shifter 1053-$n$. For example, the transmission beam control unit 1036 can maximize the reception SNR of the terminal apparatus 2A by giving $\varphi_n$ that maximizes $\gamma_1$ to the transmission variable phase shifter 1053, thus allowing the reception quality of the terminal apparatus 2A to be improved. On the other hand, the transmission beam control unit 1036 can minimize the reception SNR of the terminal apparatus 002A by giving $\varphi_n$ that minimizes $\gamma_1$ to the transmission variable phase shifter 1053. This allows, in a case of transmitting a signal to the other terminal apparatus (for example, the terminal apparatus 2B), the signal to be controlled not to be received by the terminal apparatus 2A. Hereinafter, the control of the beam pattern (antenna directivity pattern, antenna gain, beam gain) performed by the beam sweeping unit 1061 with respect to the terminal apparatus 2A is also referred to as the beam forming control (beam sweeping, beam control) for the terminal apparatus 2A. Further, the operation, performed by the terminal apparatus 2A, for the beam forming control performed by the beam sweeping unit 1061 of the base station apparatus 1 is also referred to as beam detection (antenna pattern detection, antenna gain detection) performed by the terminal apparatus 2A.

Also, in the antenna directivity pattern generated by the antenna 105, a portion having a high gain is referred to as a main beam (main lobe) or simply a beam. The controls performed by the beam sweeping unit 1061 according to the present embodiment include a control of generating a portion with a high gain in the antenna directivity pattern generated by the antenna 105. Also, in the antenna directivity pattern generated by the antenna 105, a portion with low gain is referred to as a null beam or simply null. The controls performed by the beam sweeping unit 1061 according to the present embodiment include a control of generating a portion with a low gain in the antenna directivity pattern generated by the antenna 105. Note that in the following description associated with the antenna 105, at least a part of processes of signal processing and controls performed in a case that the base station apparatus 1A transmits the downlink signal to the terminal apparatus 5002 can also be performed in a case that the base station apparatus 1A receives the uplink signal from the terminal apparatus 2.

The beam sweeping method of the beam sweeping unit 1061 according to the present embodiment is not limited to any method. For example, the beam sweeping unit 1061 can direct the beam to the terminal apparatus 2 by observing the reception quality of the signal transmitted from the terminal apparatus 2. Specifically, the base station apparatus 1 can indicate to the terminal apparatus 2 a periodical transmission of mutually known signals (for example, reference signals) in radio resources that are also mutually known. For example, the terminal apparatus 2 can transmit the reference signal in a frequency resource designated by the base station apparatus 1 with a time period specified by the base station apparatus 1. The beam sweeping unit 1061 of the base station apparatus 1 can control the antenna 105 to receive the reference signal in different antenna directivity patterns. The beam sweeping unit 1061 measures the reception quality of the signal received in each antenna directivity pattern and detects the antenna directivity pattern that has the best/ favorable (or poor) reception quality, thus allowing the antenna 105 to be configured to have an antenna directivity pattern with the main beam (or null beam) directed to the terminal apparatus 2. Further, the beam sweeping unit 1061 of the base station apparatus 1 can perform beam sweeping based on the signal transmitted from the terminal apparatus 2 without explicitly indicating to the terminal apparatus 2 a transmission of the reference signal. Note that, in the above example, the operation of the terminal apparatus 2 for transmitting the reference signal to the base station apparatus 1 is included in the beam detection operation performed by the terminal apparatus 2.

The base station apparatus 1 according to the present embodiment can transmit a signal (for example, a reference signal) with different antenna directivity patterns in different radio resources. The base station apparatus 1 obtains, from the terminal apparatus 2, information indicating the reception quality of each of the different radio resources (for example, information indicating a radio resource with the highest reception quality, information indicating a radio resource with the lowest reception quality, information indicating the reception quality itself of each radio resource, and the like). Based on the information, the base station apparatus can control the antenna directivity pattern of the antenna 105. Note that in a case that the base station apparatus 1 transmits a plurality of CSI-RSs, each having a different antenna directivity pattern, the information (index) indicating the CSI-RS resource with the suited/poor reception quality is also referred to as CSI-RS Resource Indication (CRI). Further, the reception power measured by CSI-RS is also referred to as CSI Reference Signal Received Power (CSI-RSRP). Further, the reception power measured by CSI-RS is also referred to as CSI Reference Signal Received Quality (CSI-RSRQ). Note that, the base station apparatus 1 can transmit the CSI-RS by including it in the discovery signal. The discovery signals include a cell-specific reference signal, a synchronization signal, a part or all of the CSI-RS. It should be noted that the terminal apparatus 2 can report the CRI and the combination of the CSI-RSRP/RSRQ in the CSI-RS resource to the base station apparatus 1. Note that, according to the above example, the operations of the terminal apparatus 2 for measuring the information indicating the reception quality of each of the different radio resources, and for notifying the information indicating the reception quality to the base station are included in the beam detection operations performed by the terminal apparatus 2. Note that, in a case that the base station apparatus 1 transmits signals (for example, reference signals) in a plurality of radio resources, each having a different antenna directivity pattern, the RRM (Radio Resource Management) measurement (for example, RSRP, RSRQ) and the CSI measurement (for example, channel measurement, interference measurement) that are performed by the terminal apparatus 2 are limited to the plurality of radio resources. It should be noted that the base station apparatus 1 can configure a measurement limit for each radio resource.

According to the above description, the beam sweeping unit 1061 according to the present embodiment is capable of performing beam sweeping by controlling the transmission variable phase shifter 1053 and the amplifier 1054 of the antenna 105. Namely, the beam sweeping unit 1061 according to the present embodiment can perform beam sweeping related to analog beam forming. The beam sweeping unit 1061 according to the present embodiment can also perform beam sweeping related to digital beam forming for controlling the antenna directivity pattern of the antenna 105 by controlling the antenna input 105 itself. For example, the beam sweeping unit 1061 can control precoding processing, performed by the transmitter 103, on the baseband signal of the transmission signal.

In addition, the beam sweeping unit 1061 according to the present embodiment can perform beam sweeping related to hybrid beam forming that performs both analog beam forming and digital beam forming. In the hybrid beamforming, the beam sweeping unit 1061 can perform beam sweeping related to analog beam forming and beam sweeping related to digital beam forming simultaneously or independently. It should be noted that the analog beam sweeping may be beam-swept in the time domain and the digital beamforming may be beam-swept in the frequency domain. In this case, the base station apparatus 1 may transmit a plurality of time resources (for example, OFDM symbols, subframes), each having a different analog beam pattern, and transmit a plurality of frequency resources (subcarriers, resource blocks), each having a different digital beam pattern. The terminal apparatus 2 may report the information indicating the most suitable time resource and the information indicating the most suitable frequency resource to the base station apparatus 1. It should be noted that the analog beam sweeping may be a beam sweeping with a coarse beam pattern (wide beam width), and the digital beam sweeping may be a beam sweeping with a narrow beam pattern (narrow beam width). In this case, the information indicating the suitable analog beam (the information indicating the radio resource with the best reception quality) is reported, from the terminal apparatus 2 to the base station apparatus 1, at a longer interval compared with the information indicating the suitable digital beam (the information indicating the radio resource with the best reception quality).

In accordance with the control signal input from the controller 102, the receiver 104 demultiplexes, demodulates, and decodes the reception signal received from the terminal apparatus 2A through the antenna 105, and outputs information resulting from the decoding to the higher layer processing unit 101.

In accordance with the control signal input from the controller 102, the receiver 104 demultiplexes, demodulates, and decodes the reception signal received from the terminal apparatus 2A through the antenna 105, and outputs information resulting from the decoding to the higher layer processing unit 101.

The radio reception unit 1041 converts, by down-converting, an uplink signal received through the antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 1041 removes a portion corresponding to CP from the digital signal resulting from the conversion. The radio reception unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio reception unit 1041 into the signal such as PUCCH, PUSCH, and the uplink reference signal. The demultiplexing is performed based on radio resource allocation information that is determined in advance by the radio resource control unit 1011 of the base station apparatus 1A, and that is included in the uplink grant notified to each of the terminal apparatuses 2.

Furthermore, the demultiplexing unit 1042 makes a compensation of channels including PUCCH and PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16QAM, 64QAM, 256QAM, or the like, or in compliance with the modulation scheme that the base station apparatus 1A itself notified in advance, with the uplink grant, each of the terminal apparatuses 2.

The decoding unit 1044 decodes the coded bits of PUCCH and PUSCH, which have been demodulated, at the coding rate in compliance with a coding scheme prescribed in advance, the coding rate being prescribed in advance or being notified in advance with the uplink grant to the terminal apparatus 2 by the base station apparatus 1A itself, and outputs the decoded uplink data and uplink control information to the higher layer processing unit 101. In a case where PUSCH is re-transmitted, the decoding unit 1044 performs the decoding with the coded bits input from the higher layer processing unit 101 and retained in an HARQ buffer, and the demodulated coded bits.

Figure 5:
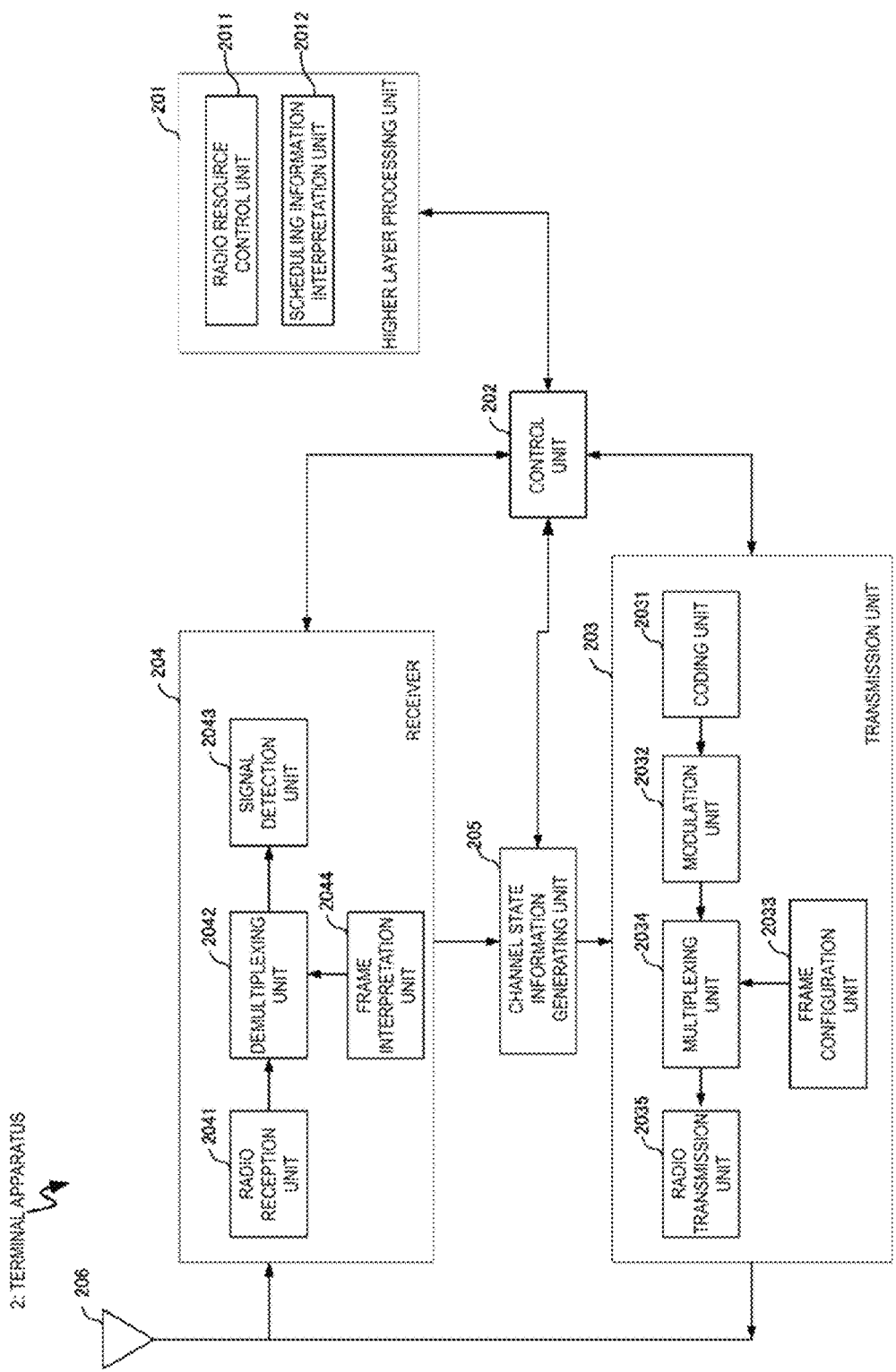
FIG. 5 is a block diagram illustrating an example of a configuration of a terminal apparatus according to an aspect of the present invention.

FIG. 5 is a schematic block diagram illustrating a configuration of the terminal apparatus 2 (the terminal apparatus 2A and the terminal apparatus 2B) according to the present embodiment. As illustrated in FIG. 5, the terminal apparatus 2A is configured to include a higher layer processing unit (higher layer processing step) 201, a controller (controlling step) 202, a transmitter (transmitting step) 203, a receiver (receiving step) 204, a channel state information generating unit (channel state information generating step) 205, and an antenna 206. The higher layer processing unit 201 is configured, including a radio resource control unit (radio resource controlling stop) 2011 and a scheduling information interpretation unit (scheduling information interpreting step) 2012. In addition, the transmitter 203 is configured to include a coding unit (coding step) 2031, a modulating unit (modulating step) 2032, a frame configuration unit (frame configuration step) 2033, a multiplexing unit (multiplexing step) 2034, and a radio transmitting unit (radio transmitting step) 2035. Further, the receiver 204 is configured to include a radio reception unit (radio receiving step) 2041, a demultiplexing unit (demultiplexing step) 2042, a signal detection unit (signal detecting step) 2043, and a frame interpretation unit (frame interpretation step).

The higher layer processing unit 201 outputs the uplink data (the transport block) generated by a user operation or the like, to the transmitter 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information indicating a terminal apparatus function supported by the terminal apparatus 2A itself.

Furthermore, the radio resource control unit 2011 manages various configuration information of the terminal apparatuses 2A itself. Furthermore, the radio resource control unit 2011 generates information to be mapped to each uplink channel, and outputs the generated information to the transmitter 203.

The radio resource control unit 2011 acquires configuration information of CSI feedback transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates the control information in order to control the receiver 204 and the transmitter 203 in accordance with the scheduling information, and outputs the generated information to the controller 202.

On the basis of the information input from the higher layer processing unit 201, the controller 202 generates a control signal for controlling the receiver 204, the channel state information generating unit 205, and the transmitter 203. The controller 202 outputs the generated control signal to the receiver 204, the channel state information generating unit 205, and the transmitter 203 to control the receiver 204 and the transmitter 203.

The controller 202 controls the transmitter 203 to transmit CSI generated by the channel state information generating unit 205 to the base station apparatus.

In accordance with the control signal input from the controller 202, the receiver 204 demultiplexes, demodulates, and decodes a reception signal received from the base station apparatus 1A through the antenna 206, and outputs the information resulting from the decoding to the higher layer processing unit 201.

The radio reception unit 2041 converts, by down-converting, a downlink signal received through the antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 2041 removes a portion corresponding to CP from the digital signal resulting from the conversion, performs fast Fourier transform on the signal from which CP has been removed, and extracts a signal in the frequency domain.

The frame interpretation unit 2044 interprets the frame configuration included in the signal transmitted from the base station apparatus 1. The frame interpretation unit 2044 can perform a blind interpretation of the frame structure. For example, the frame interpretation unit 2044 may perform a blind detection of at least a position of a resource, among the allocated resources included in the frame configuration, which accommodates information indicating the frame configuration, and interpret the frame configuration based on the information transmitted by the resource. For example, the frame interpretation unit 2044 may acquire, by the upper layer signaling such as the RRC signaling, information indicating the frame configuration, or a position of the resource that accommodates the information indicating the frame configuration, or a candidate of a position of the resource that accommodates the information indicating the frame configuration, and based on the information, may interpret the frame configuration, or may perform a blind detection of the position of the resource that accommodates the information necessary to interpret the frame configuration.

The demultiplexing unit 2042 demultiplexes the extracted signal into PHICH, PDCCH, EPDCCH, PDSCH, and the downlink reference signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the controller 202. The controller 202 outputs PDSCH and the channel estimation value of the desired signal to the signal detection unit 2043.

The signal detection unit 2043, using PDSCH and the channel estimation value, detects a signal, and outputs the detected signal to the higher layer processing unit 201.

The transmitter 203 generates the uplink reference signal in accordance with the control signal input from the controller 202, codes and modulates the uplink data (the transport block) input from the higher layer processing unit 201, multiplexes the PUCCH, the PUSCH, and the generated uplink reference signal, and performs a transmission to the base station apparatus 1A through the antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16QAM, or 64QAM, or in compliance with a modulation scheme prescribed in advance for each channel.

In accordance with the control signal input from the controller 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port. Note that, the uplink reference signal is generated by the transmitter 203 in accordance with a sequence that is obtained from a predetermined rule (formula) based on a physical cell identity (PCI, also referred to as a cell ID or the like) for identifying the base station apparatus 1A, a bandwidth for accommodating the uplink reference signal, a cyclic shift notified by the uplink grant, a parameter value for generating a DMRS sequence, and the like.

Like the frame configuration unit 1033 included in the base station apparatus 1A, the frame configuration unit 2033 provides the frame format of the transmission signal generated by the transmitter 203 (frame structure, frame type, frame form, frame pattern, frame generation method, frame definition), or information for indicating the frame format, or the frame itself. The operation of the frame configuration unit 2033 will be described later. Obviously, the function of the frame configuration unit 2033 may be included in another component (for example, the upper layer processing unit 201).

The radio transmission unit 2035 performs Inverse Fast Fourier Transform (IFFT) on a signal resulting from the multiplexing, performs the modulation for SC-FDMA scheme, generates an SC-FDMA symbol, attaches CP to the generated SC-FDMA symbol, generates a baseband digital signal, converts the baseband digital signal into an analog signal, removes unnecessary frequency components, performs up-conversion to a signal of a carrier frequency, performs power amplification, and performs an output to the antenna 206 for transmission.

The signal detection unit 2043 according to the present embodiment is capable of performing a demodulation processing based on the information on the state of the multiplex of the transmission signals addressed to the terminal apparatus and the information on the state of the retransmission of the transmission signal addressed to the terminal apparatus.

Figure 6:
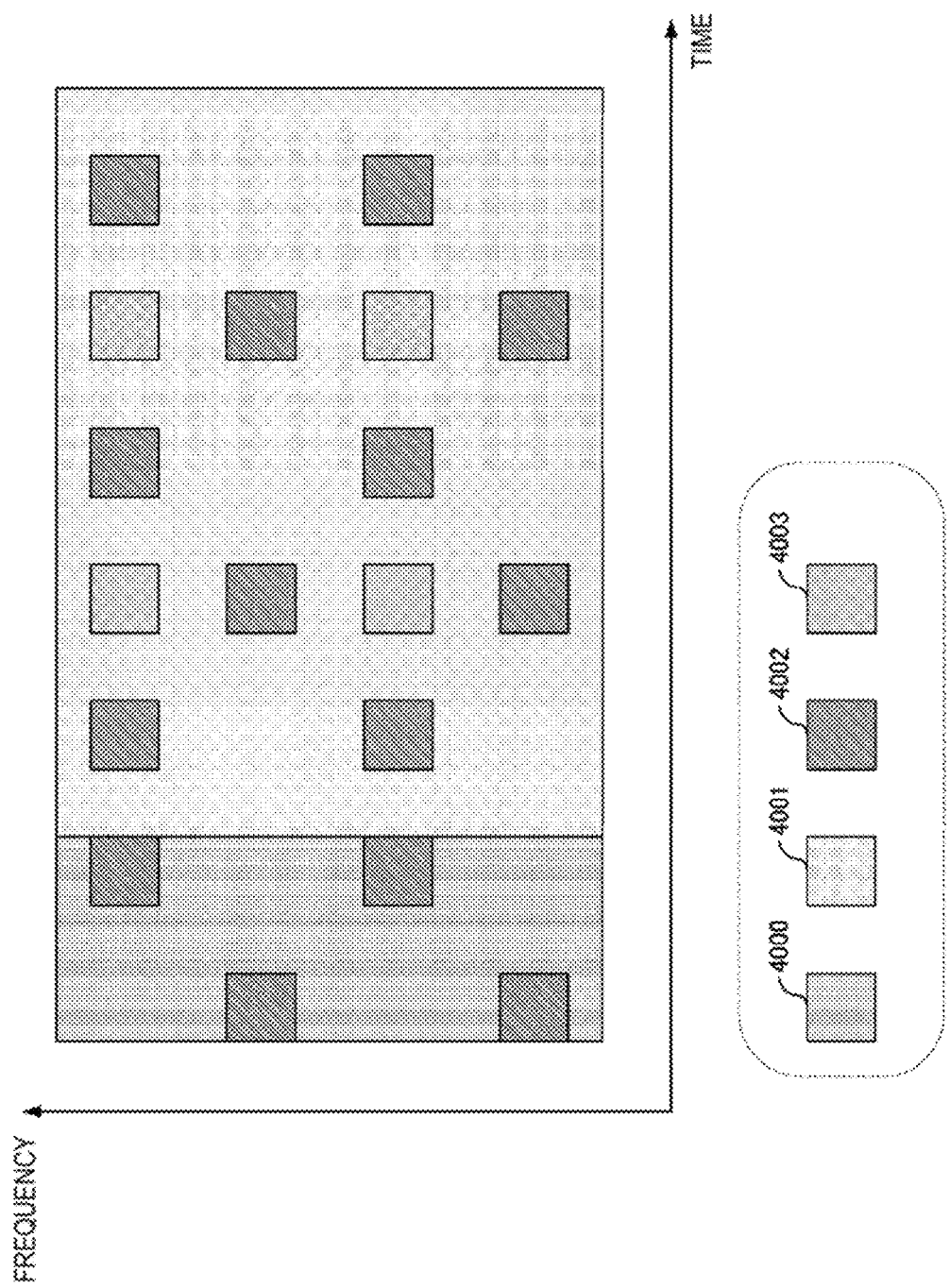
FIG. 6 is a diagram illustrating an example of a frame format according to an aspect of the present invention.

FIG. 6 is a schematic diagram illustrating an example of a frame format (the first frame format, the first frame structure, the first frame configuration) of a downlink signal generated by the frame configuration unit 1033 according to the present embodiment. As illustrated in FIG. 6, the first frame format includes at least one of a control signal resource 4000, a data signal resource 4001, a common reference signal (a common RS, a cell specific RS) resource 4002, or a unique reference signal (a unique RS, a reference signal for demodulation, a RS for demodulation, a terminal specific reference signal) resource 4003.

The signal waveform (transmission system) for realizing the frame is not limited to any system, and it may be a multicarrier transmission system typified by OFDM transmission, or a single carrier transmission system typified by SC-FDMA transmission. For example, in a case of OFDM transmission, the first frame format is constituted by a plurality of OFDM signals.

The time length (time period) and the bandwidth of each resource are not limited to any requirement. For example, the control signal resource 4000 may have 3 OFDM symbol lengths as a time length and 12 subcarriers as a bandwidth.

Figure 7:
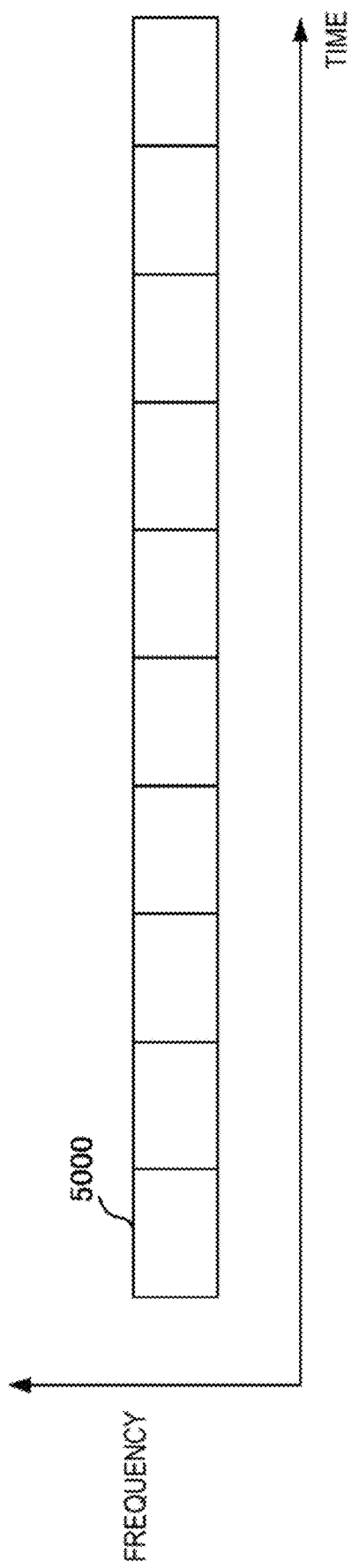
FIG. 7 is a diagram illustrating an example of a frame format according to an aspect of the present invention.

The first frame format can be aggregated in the direction of time axis and in the direction of frequency axis. FIG. 7 is a diagram illustrating an example of a frame format generated by the frame configuration unit 1033 according to the present embodiment. In the example of FIG. 7, N subframes 5000 are aggregated in the direction of time axis to form one frame. The subframe 5000 may have a configuration of the first frame format illustrated in FIG. 6. Note that, in the example of FIG. 7, the frequency bandwidth occupied by the frame is the same as the frequency bandwidth of the subframe 5000, but the subframes 5000 can be aggregated in the direction of frequency axis in the frame. For example, if eight subframes 5000 are arranged in the direction of frequency axis, the frequency bandwidth occupied by the frame is eight times the frequency bandwidth of the subframe 5000. As illustrated in FIG. 7, in a case that a frame is constituted by a plurality of subframes, the frame format illustrated in FIG. 6 is also referred to as a first subframe format, and the frame format illustrated in FIG. 7 is also referred to as a first frame format.

In the embodiment, forming a single frame by bundling a plurality of subframes is referred to as aggregation. However, the frame configuration unit 1033 may first define the frame format, generated by arranging a plurality of subframes in the direction of time axis and a plurality of subframes in the direction of frequency axis, as one frame format. Further, the number of bundles in the direction of time axis and/or in the direction of frequency axis may be configured as a parameter. In such a case, this parameter is indicated from the base station apparatus to the terminal apparatus.

Returning to FIG. 6, the control signal resource 4000 includes control information on the downlink signal transmitted from the base station apparatus 1A. The control information is, for example, information that the base station apparatus 1A transmits on the PDCCH. The control information includes common control information broadcast to all the terminal apparatuses connected to the base station apparatus 1A, and unique control information individually notified to each terminal apparatus connected to the base station apparatus 1A.

The data signal resource 4001 includes a data signal transmitted from the base station apparatus 1A. The data signal is, for example, information that the base station apparatus 1A transmits on the PDSCH.

In the common RS resource 4002, a common reference signal (common RS, cell-specific reference signal) transmitted to all the terminal apparatuses connected to the base station apparatus 1A is mapped. The common RS is used by the terminal apparatus 2A to estimate information (for example, CSI) associated with the reception quality of the terminal apparatus 2A. The common RS is also used by the terminal apparatus 2A to demodulate the signal transmitted in the control signal resource 4000. The common RS is also used by the terminal apparatus 2A to detect the base station apparatus 1A. In addition, the common RS is also used by the terminal apparatus 2A to perform synchronization processing (sampling synchronization, FFT synchronization) on a signal transmitted from the base station apparatus 1A.

A unique reference signal (unique RS, reference signal for demodulation) individually transmitted to the terminal apparatuses 2 connected to the base station apparatus 1A is mapped in the unique RS resource 4003. The unique RS is associated with the data signal, addressed to each terminal apparatus, that the base station apparatus 1A maps to the data signal resource 4001. The terminal apparatus 2A can use the unique RS transmitted to the terminal apparatus 2A to demodulate the data signal, addressed to the terminal apparatus 2A, that is mapped to the data signal resource 4001.

In the first frame format, as illustrated in FIG. 6, the data signal resource 4001 may include a common RS resource 4002 and a unique RS resource 4003. Further, the frame configuration unit 1033 can allocate the common RS resources 4002 and the unique RS resources 4003 discretely in the direction of time axis and in the direction of frequency axis. Note that the frame configuration unit 1033 may further include a control signal resource 4000 in the data signal resource 4001. The control signal resource 4000 included in the data signal resource 4001 by the frame configuration unit 1033 is, for example, a resource to which the EPDCCH is allocated, and the resource may be time multiplexed or frequency multiplexed with respect to the resource to which other signals are mapped in the data signal resource 4001.

The frame configuration unit 1033 can further include a synchronization signal resource 4004 and a broadcast signal resource 4007 in the first frame format. A synchronization signal and a broadcast signal notified to the terminal apparatus 2 capable of receiving a signal transmitted from the base station apparatus 1A are mapped to the synchronization signal resource 4004 and the broadcast signal resource 4007. The synchronization signal is a signal for the terminal apparatus 2A to perform an initial synchronization with respect to a signal transmitted from the base station apparatus 1A, and is, for example, a Primary Synchronization Signal (PSS), or a Secondary Synchronization Signal (SSS). The broadcast signal is a signal that allows the terminal apparatus 2A to acquire system information on the base station apparatus 1A, and includes, for example, information transmitted by the base station apparatus 1A on the PBCH. The frame configuration unit 1033 may not allocate the synchronization signal resource 4004 and the broadcast signal resource 4007 to all the subframes.

The base station apparatus 1A can notify (indicate), to the terminal apparatus 2A, the position of a resource that accommodates (or a possible candidate resource that may accommodate) the synchronization signal resource 4004 and the broadcast signal resource 4007. Further, the base station apparatus 1A and the terminal apparatus 2A may determine in advance the position of a resource to accommodate (or a possible candidate resource that may accommodate) the synchronization signal resource 4004 and the broadcast signal resource 4007. Note that the information that indicates the position of a resource includes information for indicating time resources (subframe number, OFDM signal number, frame number, slot number, and the like), frequency resources (subcarrier number, resource block number, frequency band number, and the like), spatial resources (transmit antenna number, antenna port number, spatial stream number, and the like), and code resources (spreading code series, code generation formula, code generation seed, and the like), and the like.

In the following description, like the above description, in a case of stating that "the base station apparatus 1A notifies information to the terminal apparatus 2A", unless otherwise specified, the case includes the state in which the information is shared in advance (or determined in advance) between the base station apparatus 1A and the terminal apparatus 2A. In general, the information notification from the base station apparatus 1A to the terminal apparatus 2A increases the overhead, while it is possible to adapt to a radio propagation environment that changes from time to time. On the other hand, in a case that the base station apparatus 1A and the terminal apparatus 2A share information in advance, the overhead is decreased, while it may be difficult to adapt to a radio propagation environment that changes from time to time.

Figure 8:
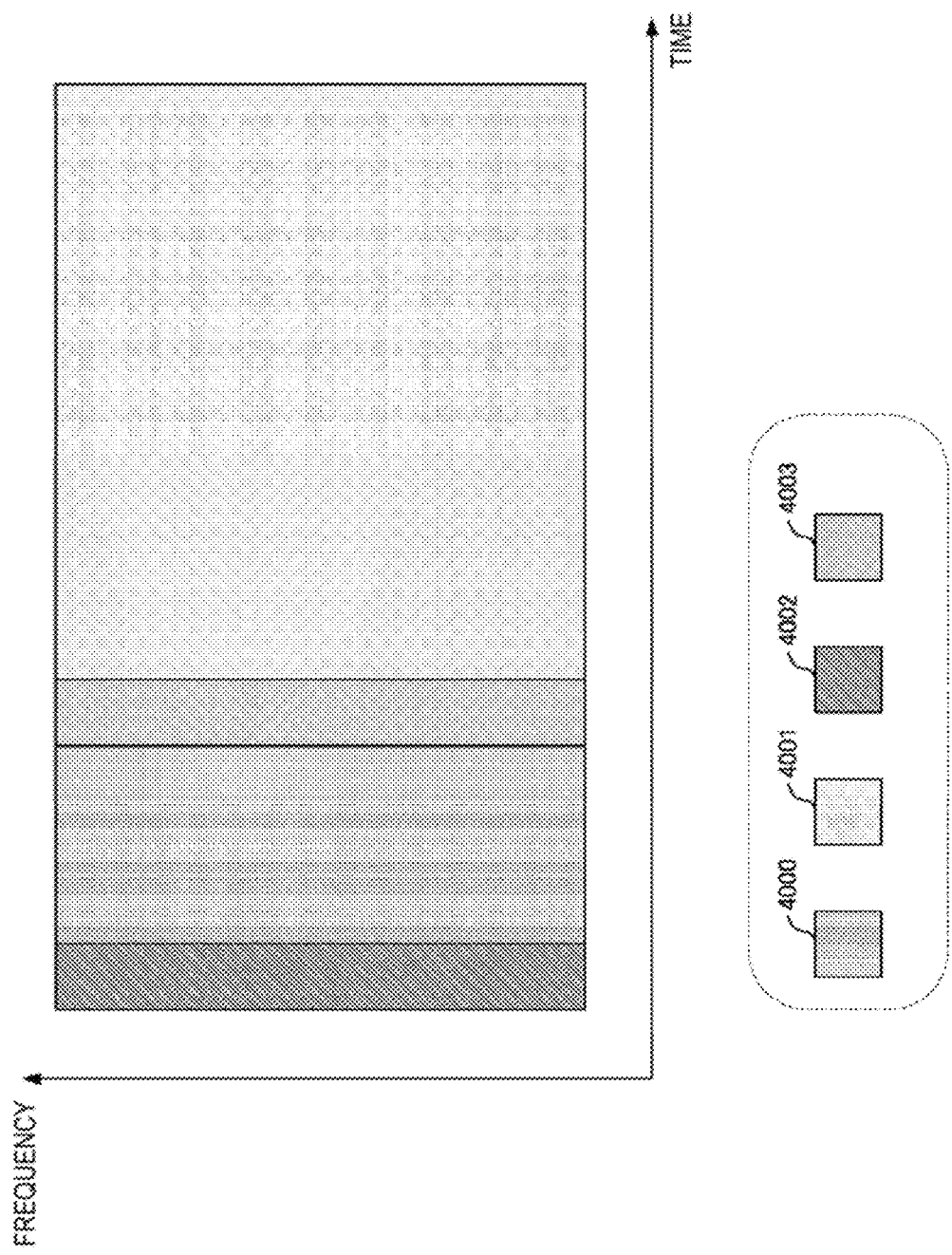
FIG. 8 is a diagram illustrating an example of a frame format according to an aspect of the present invention.

FIG. 8 is a schematic diagram illustrating an example of a frame format (a second frame format, a second frame structure) of a downlink signal generated by the frame configuration unit 1033 according to the present embodiment. As illustrated in FIG. 8, the second frame format includes at least one of a control signal resource 4000, a data signal resource 4001, a common RS resource 4002, or a unique RS resource 4003. Unlike the example illustrated in FIG. 8, the second frame format according to the present embodiment may include a configuration that does not include the common RS resource 4002, for example.

In the second frame format, the common RS resource 4002 and the data signal resource 4001 are allocated sequentially in the direction of time axis. Additionally, in the second frame format, the common RS resource 4002 and the control signal resource 4000 are allocated in the first half of the frame. Note that, in the example illustrated in FIG. 6, the unique RS resource 4003 is allocated in the first half of the frame, but the frame configuration unit 1033 may include the unique RS resource 4003 in the data signal resource 4001. In a case that the data signal resource 4001 includes the unique RS resource 4003, the frame configuration unit 1033 may allocate the unique RS resource 4003 discretely in the direction of time axis and in the direction of frequency axis within the range of the data signal resource 4001.

Note that the frame configuration unit 1033 may further include a control signal resource 4000 in the data signal resource 4001. The signal mapped to the control signal resource 4000 provided in the data signal resource 4001 by the frame configuration unit 1033 is, for example, a signal transmitted on the EPDCCH. The control signal resource 4000 may be time-multiplexed or frequency-multiplexed with respect to a resource to which other signals are mapped in the data signal resource 4001.

The terminal apparatus 2A that receives a transmission signal generated based on the second frame format is capable of performing initial synchronization processing for the apparatus that has transmitted the transmission signal by using the common RS mapped to the common RS resource 4002 allocated in the first half of the frame. Namely, the frame configuration unit 1033 according to the present embodiment may include the synchronization signal resource 4004 in the common RS resource 4002 in the second frame format. In the second frame format, the frame configuration unit 1033 can configure a common resource for accommodating the common RS resource 4002 and for accommodating the synchronization signal resource 4004. The frame configuration unit 1033 can configure a part of the common RS mapped to the common RS resource 4002 to be a synchronization signal.

A resource to accommodate the synchronization signal resource 4004 for the first frame format and a resource to accommodate the synchronization signal for the second frame may be configured as a common resource or configured as different resources by the frame configuration unit 1033. The synchronization signal transmitted by using the synchronization signal resource 4004 allocated in the first frame format, and the synchronization signal transmitted by using the synchronization signal resource 4004 allocated in the second frame format may be configured as the same signal, or configured as different signals by the base station apparatus 1A. Here, the same signal means that at least a part of the information included in the signal or a part of the wireless parameters applied to the signal is common between the signals.

In a case that the frame configuration unit 1033 allocates different resources for accommodating the synchronization signal resource 4004 (or the broadcast signal resource 4007) for the first frame format and the second frame format, the receiver 204 of the terminal apparatus 2A may perform the synchronization processing on a plurality of resources that may accommodate the synchronization signal resource 4004. Then, the receiver 204 of the terminal apparatus 2A can recognize the frame format of the signal received by the terminal apparatus 2A, based on the result of the synchronization processing for the plurality of resources. For example, in a case that the receiver 204 of the terminal apparatus 2A performs synchronization processing on resources that may accommodate synchronization signal resources 4004 in the second frame format, and determines that synchronization is established as a result, the receiver 204 of the terminal apparatus 2A can recognize that the frame format of the signal received by the terminal apparatus 2A is the second frame format. Namely, the terminal apparatus 2A can perform a blind detection of the frame format, and according to the above method, the terminal apparatus 2A can perform the blind detection of the frame format by synchronization processing.

The frame configuration unit 1033 can further include the broadcast signal resource 4007 in the second frame format. Like the first frame format, the frame configuration unit 1033 may not include the broadcast signal resource 4007 in all of the transmission signals. The resource to which the frame configuration unit 1033 allocates the broadcast signal resource 4007 for the second frame format may be configured to be the same as, or different from, the resource to which the frame configuration unit 1033 has allocated the broadcast signal resource 4007 for the first frame format.

For each frame format, the base station apparatus 1A and the terminal apparatus 2A may determine in advance the resources that accommodate (or possible resource candidates that may accommodate) the synchronization signal resource 4004 and the broadcast signal resource 4007. In this case, the base station apparatus 1A can notify the resources or resource candidate groups to the terminal apparatus 2A, by notifying the frame format of the signal transmitted by the base station apparatus 1A to the terminal apparatus 2A.

In addition, the base station apparatus 1A can configure the information included in a signal transmitted by the broadcast signal resource 4007 allocated for the first frame format and the information included in a signal transmitted in the broadcast signal resource 4007 allocated for the second frame format to be the common information, or information different from each other. Also, the base station apparatus 1A can configure the wireless parameters (coding rate, modulation scheme, code length, spreading factor, and the like) of the signal transmitted by using the broadcast signal resource 4007 allocated for the first frame format and the wireless parameters of the signal transmitted by using the broadcast signal resource 4007 allocated for the second frame format to be the common wireless parameters, or different wireless parameters from each other.

The base station apparatus 1A may notify a resource (or a possible candidate resource) to which the frame configuration unit 1033 allocates (or may allocate) the broadcast signal resource 4007 for the second frame format, to the terminal apparatus 2A. The base station apparatus 1A may notify the resource to which the frame configuration unit 1033 allocates the broadcast signal resource 4007 for the first frame format, and the resource to which the frame configuration unit 1033 allocates the broadcast signal resource 4007 for the second frame format separately to the terminal apparatus 2A.

Obviously, it is possible to determine, between the base station apparatus 1A and the terminal apparatus 2A in advance, the information on each resource that the base station apparatus 1A notifies to the terminal apparatus 2A.

The terminal apparatus 2A connected to the base station apparatus 1A can recognize the frame format of the signal received by the terminal apparatus 2A by acquiring the information included in the signal transmitted by using the broadcast signal resource 4007. Further, in a case that the frame configuration unit 1033 of the base station apparatus 1A changes the resource that accommodate the broadcast signal resource 4007 according to the frame format, the receiver 204 of the terminal apparatus 2A may perform the demodulation processing of the broadcast signal with respect to the resource that may accommodate the broadcast signal resource 4007. The terminal apparatus 2A can recognize the frame format of the signal received by the terminal apparatus 2A based on the information for indicating the resource to which the broadcast signal, which has been correctly demodulated, had been mapped. Namely, the terminal apparatus 2A can perform a blind detection of the frame format, and according to the above method, the terminal apparatus 2A can perform a blind detection of the frame format by acquiring the broadcast signal.

Like the first frame format, the frame configuration unit 1033 can define the second frame format by aggregating the subframes in the direction of time axis and in the direction of frequency axis, with the frame format illustrated in FIG. 8 being used as the second subframe format (the second subframe). In a case of aggregating subframes, the frame configuration unit 1033 can aggregate frames including all of the common RS resource 4002, the control signal resource 4000, the data signal resource 4001, and the unique RS resource 4003, and can aggregate frames including a specific combination of resources among the four resources described above. For example, in a case that frames are aggregated, the frame configuration unit 1033 can aggregate only a plurality of data signal resources 4001.

Figure 9:
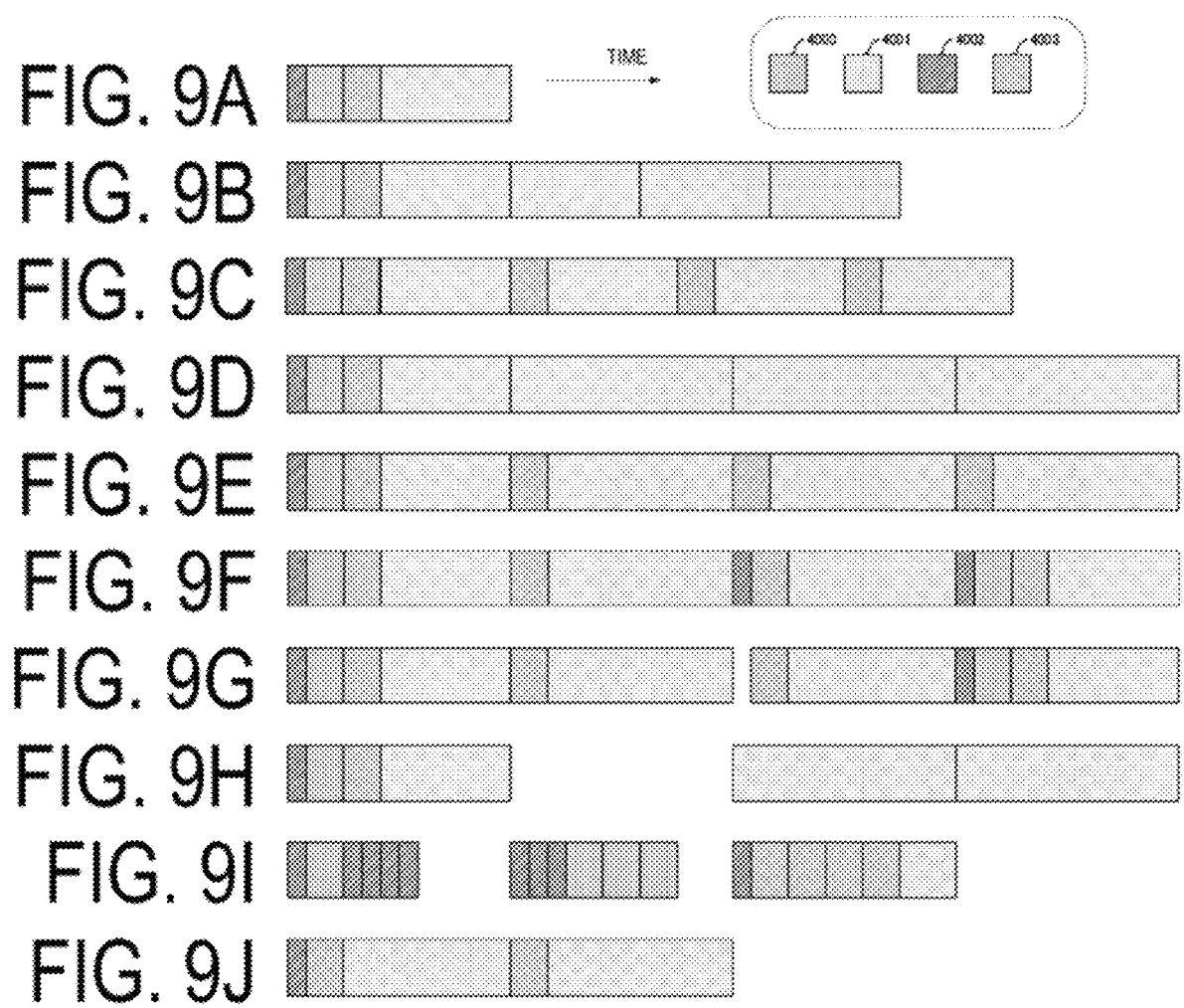
FIGS. 9A to 9J are diagrams, each illustrating an example of a frame format according to an aspect of the present invention.

FIGS. 9A to 9J are each schematic diagrams illustrating an example of a frame format (second frame format) of a downlink signal generated by the frame configuration unit 1033 according to the present embodiment. FIG. 9A illustrates a case where aggregation is not performed. As illustrated in FIG. 9B, the frame configuration unit 1033 can aggregate the data signal resources 4001 in the time direction. According to the example of FIG. 9B, the base station apparatus 1A can flexibly change the frame format according to the size of data (payload size) addressed to the terminal apparatus 2A.

As illustrated in FIG. 9C, the frame configuration unit 1033 can aggregate, in addition to the data signal resource 4001, the unique RS resources 4003 in the time direction. According to FIG. 9C, the base station apparatus 1A can map data signals addressed to different terminal apparatuses 2 to the data signal resources 4001. In addition, since the unique RSs are periodically mapped in the time direction, the base station apparatus 1A can provide a stable radio communication to the terminal apparatus 2 under the high-speed mobile environment.

As illustrated in FIG. 9D, the frame configuration unit 1033 can aggregate the data signal resource 4001 in the time direction. Here, the frame length of the data signal resource 4001 to be aggregated may be configured to be the same as the frame length of the data signal resource 4001 without aggregation (the frame length of the frame illustrated in FIG. 9A). As illustrated in FIG. 9D, even in a case that base station apparatuses located in the vicinity transmit downlink signals to each other based on the second frame format by using different aggregation sizes, frame synchronization between the base station apparatuses can easily be taken. Further, as illustrated in FIG. 9E, in addition to the data signal resource 4001, in a case that the unique RS resources 4003 are aggregated in the time direction, the frame lengths of the frames to be aggregated can be the same.

As illustrated in FIG. 9F, the frame configuration unit 1033 can further aggregate the common RS resource 4002 and the control signal resource 4000 in the time direction. Further, as illustrated in FIG. 9G and of FIG. 9H, the frame configuration unit 1033 can provide the non-transmission period (null section) of the base station apparatus 1A in the frame format. The length of the non-transmission period may be the same as the length of the data signal resource 4001 or may be an integer multiple of the element (for example, OFDM signal length) constituting the data signal resource 4001.

As illustrated in FIG. 9I, the frame configuration unit 1033 can also aggregate the control signal resource 4000, the common RS resource 4002, and the unique RS resource 4003. The frame configuration unit 1033 aggregates the common RS resource 4002, thus allowing the transmitter 103 to apply different beam forming to a common RS transmitted in each common RS resource. Therefore, for example, the terminal apparatus 2A is allowed to notify the reception quality associated with the common RSs to the base station apparatus 1A that is connected.

As illustrated in FIG. 9J, the frame configuration unit 1033 can use the second frame format that does not include the control signal resource 4000, and can also use the second frame format that does not include the control signal resource 4000 and the common RS resource 4002.

As illustrated in FIG. 9J, in a case that the base station apparatus 1A is transmitting a signal based on the second frame format that does not include the control signal resource 4000 and the common RS resource 4002, the base station apparatus 1A can transmit, at another frequency, the second frame format that includes the control signal resource 4000 and the common RS resource 4002. For example, the base station apparatus 1A is capable of transmitting a signal to be transmitted in a high frequency band of 6 GHz or higher, based on the second frame format that does not include the control signal resource 4000 and the common RS resource 4002, while the base station apparatus 1A is capable of transmitting a signal to be transmitted in a low frequency band lower than 6 GHz, based on the second frame format that includes the control signal resource 4000 and the common RS resource 4002. In this case, the base station apparatus 1A can transmit a signal to be transmitted in a low frequency band lower than 6 GHz, based on the second frame format that does not include the unique RS resource 4003 or the data signal resource 4001.

Note that, in a case that the frame configuration unit 1033 aggregates signals generated based on the second frame format in the direction of time axis and in the direction of frequency axis, the number of resources may be the same or different among the different resources included in each signal to be aggregated (for example, the common RS resource 4002 or the data signal resource 4001). However, from the viewpoint of suppressing the overhead related to signaling from the base station apparatus 1A to the terminal apparatus 2A, it is preferable that the number of resources is associated with the signal length and the frequency bandwidth of the signal to be aggregated. Also, the frame length and the frequency bandwidth of a plurality of frames to be aggregated may be the same or may be different from each other. However, from the viewpoint of suppressing overhead related to signaling from the base station apparatus 1A to the terminal apparatus 2A, it is preferable that the frame length and the frequency bandwidth of a frame respectively have an integral multiple relationship with the frame length and the frequency bandwidth of another frame.

Figure 10:
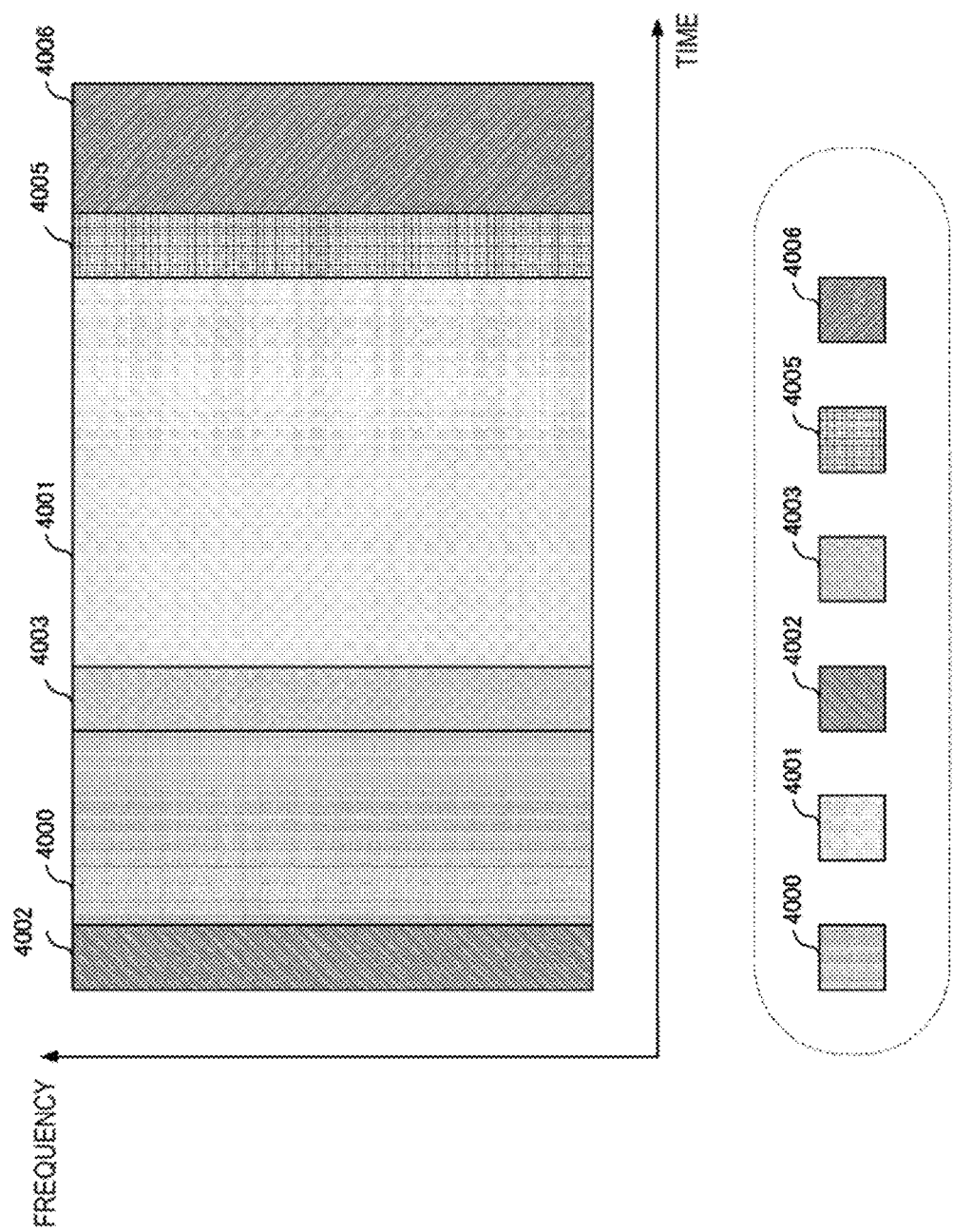
FIG. 10 is a diagram illustrating an example of a frame format according to an aspect of the present invention.

FIG. 10 is a schematic diagram illustrating an example of a frame format according to the present embodiment. As illustrated in FIG. 10, the frame configuration unit 1033 can include the RF switching period 4005 and the uplink signal resource 4006 for the second frame format. The frame format illustrated in FIG. 10 can be used by the base station apparatus 1A and the terminal apparatus 2A that employ time division duplex (TDD) as a duplex scheme. The RF switching period 4005 is a period to be used by the terminal apparatus that has received the signal transmitted by the base station apparatus 1A based on the frame format to switch the operation of the terminal apparatus from the receiving operation to the transmitting operation. The base station apparatus 1A may configure the RF switching period 4005 as a non-transmission period, or as a period during which some signal (for example, a common RS) is transmitted. Note that, in order to continuously transmit the frames generated based on the second frame format, the frame configuration unit 1033 may provide the RF switching period 4005 also in the latter half of the uplink signal resource 4006, or it is also possible to configure a non-transmission period between the frames successively transmitted. In a case that the second frame format is used, and that TDD is used, the base station apparatus 1A configures the RF switching period 4005 and the uplink signal resource 4006 to the second frame format, and in a case that the FDD is used, the base station apparatus 1A does not configure the RF switching period 4005 and the uplink signal resource 4006 to the second frame format. The base station apparatus 1A can generate a transmission signal based on the respective second frame formats.

Based on the frame format illustrated in FIG. 10, the terminal apparatus 2A that has received the transmission signal transmitted by the base station apparatus 1A, can transmit to the base station apparatus 1A information (ACK or NACK), allocated in the uplink signal resource 4006, for indicating whether the data signal mapped in the data signal resource 4001 and addressed to the terminal apparatus 2A may be received. Therefore, since the base station apparatus 1A can immediately recognize whether the data signal addressed to the terminal apparatus 2A is correctly received, it is possible to shorten the delay time related to the transmission of the downlink signal.

The frame configuration unit 1033 can define a plurality of frame formats including a first frame format and a second frame format. Further, the frame configuration unit 1033 can define a plurality of frame formats by changing the wireless parameters of the first frame format and the second frame format. Here, the wireless parameters include some or all of the parameters, such as frequency bandwidth, center frequency, frequency band, subcarrier interval, the number of subcarriers, symbol length, FFT/IFFT sampling period, GI length, CP length, frame length, subframe length, slot length, TTI, the number of FFT points, and the type of error correction code to be applied (for example, a turbo code is applied to the first frame format, a low density parity check code is applied to the second frame format, and the like). Also, in a case that different wireless parameters are configured with respect to the same frame format, the respective frame formats are also referred to as different frame format types (modes). For example, in a case that a wireless parameter 1 and a wireless parameter 2 that have different values are configured with respect to the first frame format, the respective frame formats can be referred to as a first frame format type 1 and a first frame format type 2. Also, the base station apparatus can have a wireless parameter set to which each value included in the wireless parameter is configured in advance. One or more wireless parameter sets can be configured, and the frame configuration unit 1033 can configure different frame format/frame format type by changing the wireless parameter set. In a case that there are a plurality of wireless parameter sets, each wireless parameter set can be configured by using a simple rule. For example, in a case that there are three wireless parameter sets, the subcarrier interval of the wireless parameter set 2 may be X times the subcarrier interval of the wireless parameter set 1 (X is an integer of 2 or more), and the subcarrier interval of the wireless parameter set 3 may be Y times the subcarrier interval of the wireless parameter set 2 (Y is an integer of 2 or more). Note that some parameters included in each wireless parameter set may have common values. Further, the wireless parameter set is transmitted (indicated) from the base station apparatus to the terminal apparatus. At this time, the terminal apparatus can recognize the frame format/frame type according to the wireless parameter set received from the base station apparatus. In the following description, unless otherwise specified, the frame format also means the frame format type. Further, whether a terminal supports the above wireless parameter set may depend on the capability of the terminal.

The base station apparatus 1A according to the present embodiment can selectively or simultaneously use a plurality of frame formats. Further, the base station apparatus 1A can configure different wireless parameters selectively, or common parameters partially, for the first frame format and the second frame format. The base station apparatus 1A can notify the terminal apparatus 2A of information for indicating the frame format that the base station apparatus 1A uses for the transmission signal. Here, the information that indicates the frame format includes information (numerical value, index, indicator) for indicating one of a plurality of frame formats defined by the base station apparatus 1A in advance, information for indicating resources included in the frame format (for example, information for indicating which one of the control signal resource 4000, the data signal resource 4001, the common RS resource 4002, and the specific RS resource 4003 to be included or not to be included), information for indicating the resource that accommodates different types of resources, and the resource candidate that may accommodate different kinds of resources, and the like. The base station apparatus 1A can notify at least a part of the information for indicating the frame format to the terminal apparatus 2A by using the signaling of the PHY layer or by using the signaling of the upper layer such as RRC signaling.

The base station apparatus 1A can switch the frame format for use according to the use case (or use scenario) in which the base station apparatus 1A provides a communication service. In addition, the base station apparatus 1A can change the wireless parameter of the frame format for use according to the use scenario in which the base station apparatus 1A provides a communication service.

In order to satisfy a plurality of use scenarios, the base station apparatus 1A according to the present embodiment may provide combinations (sets, collections) of a plurality of frame formats, or combinations (sets, collections) of a plurality of wireless parameter sets configured in frame formats. The base station apparatus 1A may select a frame format according to a use case in which the base station apparatus 1A provides a communication service from a frame format set (or a combination of wireless parameter sets) prepared in advance, and generate the transmission signal to be transmitted by the base station apparatus 1A. The frame format set provided by the base station apparatus 1A may be the same as, or different from, the frame format set provided by another base station apparatus. Further, the base station apparatus 1A may notify the frame format set provided by the base station apparatus 1A to the terminal apparatus 2A connected to the base station apparatus 1A.

In order to satisfy a plurality of use scenarios, the base station apparatus 1A according to the present embodiment can switch a transmission mode and select one of a plurality of transmission modes. Here, the transmission mode is defined by a combination of a wireless parameter, a multiplexing method, a scheduling method, a precoding method, and the like that the transmitter 103 of the base station apparatus 1A can use in a case of generating a transmission signal. A frame format can be assigned to each of the plurality of transmission modes. It should be noted that the frame formats/wireless parameters assigned to the plurality of transmission modes may be different for each transmission mode or may be the same for some transmission modes. In this case, the base station apparatus 1A can selectively use a plurality of frame formats/wireless parameters by selecting the transmission mode.

The base station apparatus 1A may use a plurality of frame formats selectively or simultaneously for three use scenarios: Enhanced mobile broadband (EMBB), Enhanced Massive machine type communication (EMTC), and Ultra-reliable and low latency communication (URLLC). Further, the base station apparatus 1A can use the second frame format having different wireless parameters for EMBB, EMTC, and URLLC individually. The frame configuration unit 1033 can select a frame format and determine wireless parameters to be configured in the frame format in accordance with the use scenario in which the base station apparatus 1A provides a communication service.

For example, the base station apparatus 1A can generate a frame based on the first frame format for the downlink signal related to the EMBB, and generate a frame based on the second frame format for the downlink signal related to the MMTC and the URLLC. In this method, the base station apparatus 1A switches the frame format according to the use case (or use scenario) in which the base station apparatus 1A provides a communication service. However, the method according to the present embodiment is not necessarily limited to a method in which the frame format is defined for each use case.

The base station apparatus 1A can use a plurality of frame formats/wireless parameters selectively or simultaneously based on a wireless medium in which the base station apparatus 1A transmits a downlink signal. Here, the wireless medium can include radio resources such as time resources and frequency resources. Further, the wireless medium may include a wireless resource distinguished by a duplex scheme applied to a frequency band in which the base station apparatus 1A transmits a downlink signal.

Further, the wireless medium can include radio resources to be distinguished according to the use case (or use scenario) in which the base station apparatus 1A provides a communication service. The base station apparatus 1A can select the wireless medium to be used according to the use case (or use scenario) that provides the communication service. The base station apparatus 1A can determine in advance a wireless medium to be used for providing the communication service for each use case (or use scenario). Therefore, the wireless medium and the use case are associated with each other, and the base station apparatus 1A may use a plurality of frame formats/wireless parameters selectively or simultaneously based on the use case (or use scenario) with which the wireless medium to be used is associated.

The base station apparatus 1A may notify to the terminal apparatus 2A information for indicating a plurality of frame formats/wireless parameters used selectively or simultaneously, based on the wireless medium in which the base station apparatus 1A transmits a downlink signal, by using a higher layer signaling such as the PHY layer/MAC layer and RRC signaling. It should be noted that the base station apparatus 1A may not notify all of the information for indicating the plurality of frame formats/wireless parameters described above to the terminal apparatus 2A, and for example, the base station apparatus 1A may notify the candidates of the plurality of frame formats/wireless parameters to the terminal apparatus 2A. The terminal apparatus 2A may receive, from the base station apparatus 1A, signaling of information for indicating a plurality of frame formats/wireless parameters that the base station apparatus 1A selectively or simultaneously uses based on the wireless medium, or may also perform a blind detection of some of the information. Note that, the terminal apparatus 2A may notify to the base station apparatus 1A the information on the plurality of frame formats/wireless parameters that the terminal apparatus 2A can receive.

The base station apparatus 1A can use a plurality of frame formats/wireless parameters selectively or simultaneously according to the frequency (frequency band, channel) at which downlink signals are transmitted. For example, the base station apparatus 1A can configure frequencies at which downlink signals can be transmitted to form a plurality of groups. For example, the base station apparatus 1A may configure a frequency lower than 6 GHz (Below 6 GHz) as the frequency band 1, and configure a frequency of 6 GHz or higher (Above 6 GHz) as the frequency band 2. The frame format can be switched for use between the case of transmitting the downlink signal in the frequency band 1, and the case of transmitting the downlink signal in the frequency band 2. Also, the base station apparatus 1A may configure a frequency less than 2 GHz as the frequency band 1, a frequency of 2 GHz or higher and lower than 6 GHz as the frequency band 2, and a frequency of 6 GHz or higher as the frequency band 3. This configuration allows the base station apparatus 1A to generate a transmission signal based on the frame format defined for each frequency band, in a case of transmitting the downlink signal in each frequency band.

The base station apparatus 1A can simultaneously transmit signals generated based on different frame formats/wireless parameters. FIG. 11 is a schematic block diagram illustrating an example configuration of a downlink signal transmitted by the base station apparatus 1A according to the present embodiment. According to the example of FIG. 11, the base station apparatus 1A uses a different frame format depending on a frequency. The base station apparatus 1A can mix a plurality of different frame formats in one OFDM signal. For example, a plurality of subcarriers constituting one OFDM signal are configured to form a plurality of subcarrier groups, and transmission signals mapped in each subcarrier group are generated based on different frame formats. According to the example of FIG. 11, the second frame format includes an RF switching period 4005 and an uplink signal resource 4006. Therefore, the base station apparatus 1A can generate a signal based on the first frame format and a signal based on the second frame format as different OFDM signals, and perform frequency multiplex of the different OFDM signals to simultaneously transmit the different OFDM signals.

According to the example of FIG. 11, although the subcarrier group generated based on the first frame format and the subcarrier group generated based on the second frame format are adjacent to each other, the frame configuration unit 1033 can also allocate a guard band (null subcarrier, unused frequency) between the subcarrier groups. Further, according to the example of FIG. 11, the subcarrier group generated based on the first frame format and the subcarrier group generated based on the second frame format have the same frame length of the signal to be transmitted, but may have a different frame length of the signal. However, from the viewpoint of synchronization in the wireless network, it is preferable that the frame lengths of the signals to be transmitted in the subcarrier groups have an integer multiple relationship to each other.

Further, the transmitter 103 of the base station apparatus 1A can generate a filtered OFDM signal to which a filter is applied for each subcarrier or for each subcarrier group constituted by a plurality of subcarriers. Filtered OFDM can be, for example, Filter bank multicarrier or Filtered OFDM. In the filtered OFDM, interference between subcarriers (or between subcarrier groups) is greatly suppressed. The base station apparatus 1A can assign different frame formats to a plurality of subcarrier groups that the base station apparatus 1A generates. For example, the transmitter 103 of the base station apparatus 1A can generate the first subcarrier group based on the first frame format, generate the second subcarrier group based on the second frame format, and generate the filtered OFDM signal including the first subcarrier group and the second subcarrier group.

The base station apparatus 1A can define a frame format for each duplex method. For example, the base station apparatus 1A can define different frame formats in a case of FDD and a case of TDD. The base station apparatus 1A can generate a transmission signal based on the first frame format in the case of FDD, and generate a transmission signal based on the second frame format in the case of TDD.

Also, the base station apparatus 1A can selectively use a plurality of frame formats in one duplex method. For example, in a case that the FDD is used as the duplex scheme, the base station apparatus 1A can use the first frame format and/or the second frame format selectively or simultaneously. Further, the base station apparatus 1A can selectively or simultaneously use a plurality of wireless parameters for the first frame format (or the second frame format) in one duplex method.

Further, the base station apparatus 1A can use a duplex method in which both FDD and TDD are used, and the base station apparatus 1A can define a frame format for the duplex method in which both FDD and TDD are used. Further, in the duplex scheme in which both FDD and TDD are used, the base station apparatus 1A can use a plurality of frame formats or wireless parameters selectively or simultaneously. As a duplex scheme in which both FDD and TDD are used, the base station apparatus 1A can use a duplex scheme in which FDD and TDD are temporally switched in a frequency band. As a duplex scheme in which both FDD and TDD are used, the base station apparatus 1A can use Full duplex (or Simultaneous transmission and reception (STR)) which performs an uplink transmission and a downlink transmission simultaneously. In the STR, the base station apparatus 1A and the terminal apparatus 2A can simultaneously transmit transmission signals that are respectively generated based on different frame formats.

As for the wireless parameter to be configured in the first frame format and the second frame format, the base station apparatus 1A may configure a different wireless parameter depending on a frequency band for transmitting a transmission signal to be generated based on each frame format. The frequency band may be a so-called licensed band for which a wireless service provider has obtained an authorization of use (license) from the country or region, or a so-called unlicensed band for which an authorization of use is not required from the country or region.

As for the wireless parameters to be configured in the first frame format and the second frame format, in a case that the frequency band for transmitting the transmission signal to be generated based on each frame format is an unlicensed band, the base station apparatus 1A can change the wireless parameter to configure according to the frequency band of the license band. The base station apparatus 1A can change the wireless parameter depending on whether the unlicensed band for transmitting the transmission signal is 5 GHz band or 60 GHz band, for example.

The base station apparatus 1A can use the frame format, obtained by extending an occupied frequency bandwidth to be an integral multiple of the occupied frequency bandwidth of the frame format used in the unlicensed band of 5 GHz band, for the unlicensed band of 60 GHz band. Further, the base station apparatus 1A can bundle, in the direction of frequency axis, a plurality of transmission signals generated in a frame format used for a license band of 6 GHz or higher for use in an unlicensed band of 60 GHz band. The base station apparatus 1A, by itself or in cooperation with other base station apparatuses, can transmit component carriers generated based on a frame format used for a license band of 6 GHz or higher. The component carriers, allocated in the unlicensed band of 60 GHz, can be simultaneously transmitted to the terminal apparatus 2A by using Carrier Aggregation (CA) and Dual Connectivity (DC).

In the unlicensed band of 60 GHz band, the base station apparatus 1A can use a frame format having a bandwidth identical to the bandwidth of the channel defined by IEEE 802.11ad (for example, 2 GHz or 2.16 GHz), or a frame format having another bandwidth that is an integral multiple of the bandwidth. Further, the base station apparatus 1A can use a frame format, having a frequency bandwidth whose integral multiples (including equal magnification) coincides with the bandwidth of the channel defined in IEEE 802.11ad, for an unlicensed band of 60 GHz band, or a licensed band of 6 GHz or higher.

As for the wireless parameters to be configured in the first frame format and the second frame format, the base station apparatus 1A can configure a different wireless parameter depending on a frequency band for transmitting a transmission signal to be generated based on each frame format. The frequency band may be an occupied frequency band that one radio carrier can occupy, or a shared frequency band (Shared band) that a plurality of radio carriers share for use.

The base station apparatus 1A can map a plurality of transmission signals generated based on different frame formats in the direction of frequency axis. In a case that the plurality of transmission signals generated based on different frame formats are mapped in the direction of frequency axis, the base station apparatus 1A can simultaneously transmit the plurality of transmission signals by using carrier aggregation (CA) for aggregating and transmitting a plurality of component carriers (CC). Note that the plurality of CCs transmitted by using the carrier aggregation can be transmitted from a plurality of different base station apparatuses. In the carrier aggregation, one primary cell (PCell) and one or more secondary cells (SCell) are configured as an aggregation of serving cells.

The base station apparatus 1A can use different frame formats/wireless parameters for a plurality of CCs transmitted by using CA. For example, in a case that the base station apparatus 1A transmits two CCs by using CA, the first frame format can be applied to the first CC and the second frame format can be applied to the second CC. In addition, the base station apparatus 1A can generate the transmission signal to be transmitted by each CC based on the second frame format in which different wireless parameters are configured. Namely, the base station apparatus 1A can configure a frame format/wireless parameter for each cell. For example, the base station apparatus 1A can communicate by using the first frame format in the PCell/SCell and communicate by using the second frame format in the SCell. Also, the base station apparatus 1A communicates by using the second frame format in the PCell and the SCell, but the wireless parameters to be configured can be different for each cell.

The base station apparatus 1A can include information for indicating a frame format configured in the CC constituting the secondary cell, in the control information allocated to the control signal resource 4000 included in the CC constituting the primary cell.

In a case that a plurality of transmission signals generated based on different frame formats are mapped in the direction of frequency axis, the base station apparatus 1A can perform, in cooperation with other base station apparatuses, a transmission by using dual connectivity (DC) for transmitting signals simultaneously from a plurality of transmission points. In DC, a master cell group (MCG) and a secondary cell group (SCG) are configured as a group of serving cells. The MCG is constituted by a PCell and optionally one or more SCells. In addition, the SCG is constituted by a primary SCell (PSCell) and optionally one or more SCells. For example, in a case that the base station apparatus 1A and the base station apparatus 1B transmit a downlink signal to the terminal apparatus 2A by using DC, the base station apparatus 1A and the base station apparatus 1B can generate and transmit the transmission signal based on a frame format/wireless parameter different from each other. Also, in a case that the base station apparatus 1A and the base station apparatus 1B transmit a downlink signal to the terminal apparatus 2A by using DC, the base station apparatus 1A and the base station apparatus 1B can respectively generate and transmit the transmission signal based on the second frame format in which different wireless parameters are configured. In other words, the base station apparatus 1A can configure a frame format/wireless parameter for each cell. For example, different frame formats are configured for PCell and PSCell, and different frame formats are configured for PCell/PSCell and SCell. Also, the base station apparatus 1A/1B can configure the second frame format in which different wireless parameters are configured for PCell and PSCell.

The base station apparatus 1A can notify the terminal apparatus 2A of the information on the frame format/wireless parameter configured for each of the plurality of downlink signals mapped in the direction of frequency axis. In a case of using CA or DC, the base station apparatus 1A can transmit the information on the frame format/wireless parameter configured for each cell to the terminal apparatus 2A.

The base station apparatus 1A can map a plurality of transmission signals generated based on different frame formats/wireless parameters in the spatial direction. For example, in a case that the base station apparatus 1A simultaneously transmits the downlink signals to the terminal apparatus 2A and the terminal apparatus 2B by using multi-user multiple input multiple output transmission (MU-MIMO), the base station apparatus 1A can generate the transmission signal addressed to the terminal apparatus 2A and the transmission signal addressed to the terminal apparatus 2B based on frame formats different from each other, and perform spatial multiplexing and transmission of the two transmission signals. Namely, in the transmission signals to be transmitted by the base station apparatus 1A according to the present embodiment, the transmission signals generated based on different frame formats in the spatial direction can be spatially multiplexed.

In a case that the base station apparatus 1A multiplexes transmission signals generated based on different frame formats in the spatial direction, the base station apparatus 1A can configure at least a part of the resources that accommodate the unique RS resources 4003 to be common to the frame formats.

Further, in a case that the terminal apparatus 2A has the function of eliminating or suppressing interference between users or interference between adjacent cells, the base station apparatus 1A can transmit assist information for eliminating or suppressing the interference between users or the interference between adjacent cells. Assist information (adjacent cell information) includes some or all of the parameters including physical cell ID, the number of CRS ports, $P_A$ list, $P_B$, Multimedia Broadcast multicast service Single Frequency Network (MBSFN) subframe setting, transmission mode list, resource allocation granularity, TDD UL/DL subframe configuration, ZP/NZP CSI-RS configuration, QCL (quasi co-location) information, frame format, and wireless parameter. The parameter PA is a power ratio (power offset) between PDSCH in an OFDM symbol to which CRS is not mapped and CRS. The parameter $P_B$ represents the power ratio (power offset) between the PDSCH in the OFDM symbol to which the CRS is mapped and the PDSCH in the OFDM symbol to which the CRS is not mapped. The QCL information is information on QCL for a prescribed antenna port, a prescribed signal, or a prescribed channel. In the two antenna ports, in a case that a long term performance of the channel for carrying symbols on an antenna port can be inferred from the channel for carrying symbols on another antenna port, those antenna ports are referred to as QCL. The long term performance includes delay spread, Doppler spread, Doppler shift, average gain and/or average delay. Namely, in a case that the two antenna ports are QCL, the terminal apparatus can assume that the two antenna ports have the same long term performance. In each of the parameters included in the above-described assist information, one value (candidate) may be configured, or multiple values (candidates) may be configured. In a case that the multiple values are configured, the terminal apparatus interprets that the values that may be configured by the interfering base station apparatus are indicated in the parameter, and detects (specifies) a parameter that is configured as an interference signal from the multiple values. Further, the assist information described above may indicate information of another base station apparatus/beam, or may indicate information of the base station apparatus/beam that transmits the assist information. In addition, the assist information described above may be used in a case that various types of measurement are performed. The measurement includes Radio Resource Management (RRM) measurement, Radio Link Monitoring (RLM) measurement, and Channel State Information (CSI) measurement.

The antenna directivity pattern formed by the antenna 105 of the base station apparatus 1 according to the present embodiment can be determined based on the frame configuration configured by the frame configuration unit 1033. In a case that the antenna 105 is capable of forming a plurality of antenna directivity patterns, the antenna 105 can respectively associate the plurality of antenna directivity patterns with a plurality of frame configurations that can be configured by the frame configuration unit 1033. For example, in a case that the frame configuration unit 1033 can configure two frame configurations (first frame configuration and second frame configuration) that have different subcarrier intervals, the antenna 105 can configure an antenna directivity pattern configurable in a case that the frame configuration unit 1033 configures a first frame configuration, and configure an antenna directivity pattern configurable in a case that the frame configuration unit 1033 configures a second frame configuration, respectively. In this case, based on the frame configuration configured by the frame configuration unit 1033, the antenna 105 can determine the antenna directivity pattern that can be selected. A single antenna directivity pattern or multiple antenna directivity patterns may be configured by the antenna 105 for each frame configuration. In addition, the antenna directivity pattern configured by the antenna 105 for each frame configuration may be exclusively configured for each frame configuration (the antenna directivity pattern that the antenna 105 can configure is different for each frame configuration), or may be configured in common to some of the frame configurations (the antenna directivity pattern that the antenna 105 can configure is common to some of the frame configurations).

Such a control allows the base station apparatus 1 according to the present embodiment to configure (define, select) the antenna directivity pattern for each frame configuration. In a case that the frame configuration unit 1033 configures a plurality of frame configurations, an appropriate antenna directivity pattern can be configured for each frame structure. For example, in a case that the frame configuration unit 1033 determines a frame configuration based on a carrier frequency, the base station apparatus 1 according to the present embodiment is capable of selecting an antenna directivity pattern suitable for the carrier frequency at which the frame configuration is used.

The beam sweeping unit 1061 of the base station apparatus 1 according to the present embodiment can perform beam sweeping on the antenna directivity pattern of the antenna 105 based on the frame configuration configured by the frame configuration unit 1033. The beam sweeping unit 1061 can perform beam sweeping for each frame configuration. For example, the beam sweeping unit 1061 can transmit a signal (for example, reference signal) by using a different antenna directivity pattern in a different radio resource for each frame structure. The terminal apparatus 2 can measure the information for indicating the reception quality of the received signal for each frame structure and notify the measured information to the base station apparatus 1. The base station apparatus 1 can recognize the appropriate antenna directivity pattern for each frame configuration by acquiring the information, notified from the terminal apparatus 2, for indicating the reception quality for each frame configuration.

The method for transmitting, by the terminal apparatus 2, information on the measured reception quality to the base station apparatus 1 is not limited to anything. The terminal apparatus 2 may transmit the information on the reception quality at a carrier frequency at which beam sweeping is performed by the beam sweeping unit 1061 of the base station apparatus 1, or may transmit the information on the reception quality at another carrier frequency different from the carrier frequency. Further, the terminal apparatus 2 may notify to the base station apparatus 1 the information on the antenna directivity pattern of the base station apparatus 1 (for example, information on the reception quality for each antenna directivity pattern as described above), which is measured based on a signal having a prescribed frame configuration, by using a signal having a frame configuration other than the prescribed frame configuration.

The beam sweeping unit 1061 of the base station apparatus 1 according to the present embodiment can perform beam sweeping on the antenna directivity pattern of the antenna 105 in a case that the frame configuration configured by the frame configuration unit 1033 is a prescribed frame configuration. In the base station apparatus 1, for example, in a case that the frame configuration unit 1033 can configure two frame configurations (first frame configuration and second frame configuration) with different subcarrier intervals, the beam sweeping unit 1061 can perform the beam sweeping on the antenna directivity pattern of the antenna 105 only in a case that the frame configuration unit 1033 configures the first frame configuration.

In a case that the frame interpretation unit 2044 interprets the frame configuration included in the signal transmitted from the base station apparatus 1 as a prescribed frame configuration, the terminal apparatus 2 performs an operation associated with the beam sweeping of the beam sweeping unit of the base station apparatus 1. For example, in a case that the frame interpretation unit 2044 interprets the frame configuration of the signal transmitted from the base station apparatus 1 as a prescribed frame configuration, the receiver 204 of the terminal apparatus 2 can measure the reception quality of the signals, each of the signals being transmitted from the terminal apparatus 1 in a different radio resource. At this time, the base station apparatus 1 can transmit signals to be transmitted in different radio resources by using different antenna directivity patterns respectively. Further, the base station apparatus 1 and the terminal apparatus 2 can share in advance radio resources to which the base station apparatus 1 maps signals to be transmitted with different antenna directivity patterns, and the base station apparatus 1 can also provide the information for indicating the radio resources to the terminal apparatus 2 by means of signaling. Therefore, the terminal apparatus 2 can measure the reception quality of the different radio resources and notify information on the reception quality (the reception quality value, the information for indicating the radio resource with the highest reception quality, the information for indicating the radio resource with the lowest reception quality, and the like) to the base station apparatus 1. Namely, in a case that the frame configuration included in the signal transmitted from the base station apparatus 1 is a prescribed frame configuration, the antenna 206 of the terminal apparatus 2 according to the present embodiment is capable of performing an operation to detect a plurality of beams transmitted by the base station apparatus 1.

The prescribed frame configuration for the beam sweeping unit 1061 to perform beam sweeping is not limited to any frame configuration. For example, in a case that the subcarrier interval of the frame configuration configured by the frame configuration unit 1033 is equal to or longer than a prescribed interval or the maximum interval, the beam sweeping unit 1061 can perform the beam sweeping on the antenna directivity pattern of the antenna 105. For example, in a case that a prescribed resource is allocated to the frame configuration configured by the frame configuration unit 1033 (for example, in a case that a common RS resource is allocated, in a case that a unique RS resource is allocated, in a case that a plurality of common or unique RS resources are allocated), the beam sweeping unit 1061 can perform the beam sweeping on the antenna directivity pattern of the antenna 105. It should be noted that a single frame configuration or a plurality of frame configurations may be used as the prescribed frame configuration.

The beam sweeping unit 1061 can select whether to perform analog beam forming, digital beam forming, or both based on the frame configuration in a case of performing beam sweeping related to hybrid beam forming. For example, the beam sweeping unit 1061 can perform only analog beam forming in a prescribed frame configuration, and can perform only digital beam forming in a frame configuration other than the prescribed frame configuration. Similarly, the beam sweeping unit 1061 may perform both digital beam forming and analog beam forming in a prescribed frame configuration, and may perform only digital beam forming in a frame configuration other than the prescribed frame configuration. Here, the prescribed frame configuration is not limited to any frame configuration. For example, the prescribed frame configuration can be a frame configuration with a longer subcarrier interval than other frame configurations.

The base station apparatus 1 can notify the terminal apparatus 2 of information for indicating a prescribed frame configuration in which the beam sweeping unit 1061 performs beam sweeping. The base station apparatus 1 can notify the terminal apparatus 2 of the information for indicating the prescribed frame configuration as the control information of the physical layer such as the PDCCH. The base station apparatus 1 can notify the terminal apparatus 2 of the information for indicating the prescribed frame configuration by using the frame having the prescribed frame configuration. The base station apparatus 1 can notify the terminal apparatus 2 of the information for indicating the prescribed frame configuration by means of signaling of an upper layer such as RRC signaling.

The terminal apparatus 2 receives, from the base station apparatus 1, information for indicating a prescribed frame configuration in which beam sweeping is to be performed. This allows the antenna 206 to perform a beam detection only in a case that the frame interpretation unit 2044 of the terminal apparatus 2 interprets the frame configuration included in the signal transmitted from the base station apparatus 1 as the prescribed frame configuration.

The beam sweeping unit 1061 can perform beam sweeping on the antenna directivity pattern of the antenna 105 within a prescribed time period. The unit of the prescribed time period may be defined as an absolute time such as millisecond, or may be a unit of frame (subframe unit, symbol unit) of a frame configuration configured by the frame configuration unit 1033. It should be noted that the prescribed time period may be configured by the base station apparatus 1 as a measurement restriction. The length of the prescribed time period in which the beam sweeping unit 1061 according to the present embodiment performs beam sweeping may be common to a plurality of frame configurations configured by the frame configuration unit 1033, or may be different from each other.

The beam sweeping unit 1061 can perform beam sweeping on a plurality of antenna directivity patterns within the prescribed time period. The beam sweeping method is not limited to any beam sweeping method. For example, the antenna 105 of the base station apparatus 1 may form different antenna directivity patterns in different radio resources within the prescribed time period, and transmit a signal (for example, a reference signal) to the terminal apparatus 2. For example, the antenna 105 of the base station apparatus 1 may receive a plurality of signals (for example, reference signals) transmitted from the terminal apparatus 2 in different antenna directivity patterns within the prescribed time period, and measure the reception quality.

The beam sweeping unit 1061 according to the present embodiment performs beam sweeping on antenna directivity patterns in the prescribed time period, and the number of the antenna directivity patterns (in the above example, the number of radio resources in which the antenna 105 transmits signals within the prescribed time period or the number of signals that are transmitted from the terminal apparatus 2 and received by the antenna 105) can be determined based on the frame configuration configured by the frame configuration unit 1033. For example, the number of antenna directivity patterns on which the beam sweeping unit 1061 according to the present embodiment can perform beam forming within the predetermined time period can be configured to a different value for each frame configuration configured by the frame configuration unit 1033.

For example, in a case that the frame configuration unit 1033 can configure two frame configurations (first frame configuration and second frame configuration) having different subcarrier intervals, and that the subcarrier interval of the first frame configuration is longer than the subcarrier interval of the second frame configuration, the number of antenna directivity patterns on which the beam sweeping unit 1061 performs beam sweeping within the prescribed time period in the first frame configuration can be made longer than the number of antenna directivity patterns on which the beam sweeping unit 1061 performs beam sweeping within the prescribed time period in the second frame configuration.

The terminal apparatus 2 can perform operations related to a plurality of antenna directivity patterns configured by the antenna 105 of the base station apparatus 1 within a prescribed time period. For example, the terminal apparatus 2 can transmit a plurality of reference signals within the prescribed time period. By using the plurality of reference signals, the base station apparatus 1 can measure the reception quality of the plurality of antenna directivity patterns of the antenna 105 within the prescribed time period. The number of the reference signal which the terminal apparatus 2 transmits within the prescribed time period, may be determined based on the frame configuration, included in the transmitted signal transmitted by the base station apparatus 1, which is interpreted by the frame interpretation unit 2044, or determined based on the frame configuration of the reference signal configured by the frame configuration unit 2033.

In addition, the terminal apparatus 2 can measure the reception quality of the signals, transmitted by the base station apparatus 1 with different antenna directivity patterns in different radio resources, within a prescribed time period. The number of radio resources for which the terminal apparatus 2 measures the reception quality within the prescribed time period may be determined based on a frame configuration, included in the signal transmitted by the base station apparatus 1, which is interpreted by the frame interpretation unit 2044.

The method described above is basically described based on an example in which in a case that the base station apparatus 1 transmits a signal to the terminal apparatus 2, the antenna directivity pattern to be formed by the antenna 105 is controlled by the beam sweeping unit 1061. According to the above-described method, the beam sweeping unit 1061 can also scan the antenna directivity pattern formed by the antenna 105 in a case that the base station apparatus 1 receives a signal from the terminal apparatus 2. It should be noted that the terminal apparatus 2 can transmit a signal (for example, a reference signal) for beam sweeping according to an indication or a configuration from the base station apparatus 1.

The frame configuration unit 1033 according to the present embodiment can configure the frame configuration for each carrier frequency (frequency band), and the beam sweeping unit 1061 can configure an antenna directivity pattern that is the same as the antenna directivity pattern configured to a prescribed frequency band at a frequency band other than the prescribed frequency band. For example, in a case that the frame configuration unit 1033 configures a frame configuration common to the first frequency band and the second frequency band, the beam sweeping unit 1061 may perform beam sweeping in the first frequency band (or the second frequency band), and use an antenna directivity pattern of the antenna 105 configured by the beam sweeping as an antenna directivity pattern of the antenna 105 in the second frequency band (or the first frequency band).

Further, the antenna 206 of the terminal apparatus 2 according to the present embodiment can perform some of the operations of the antenna 105 included in the base station apparatus 1. Namely, the antenna 206 according to the present embodiment can have the same device configuration as the antenna 105. In this case, of course, the antenna 206 can perform analog beam forming, digital beam forming and hybrid beam forming like the antenna 105. Like the beam sweeping unit 1061 of the base station apparatus 1, the terminal apparatus 2 according to the present embodiment can include a beam sweeping unit 2061. Like the beam sweeping unit 1061, the beam sweeping unit 2061 can control the antenna directivity pattern of the antenna 206. The number of antenna directivity patterns that can be scanned by the beam sweeping unit 2061 may not be the same as the number of antenna directivity patterns that can be scanned by the beam sweeping unit 1061. Similarly, the base station apparatus 1 can perform a beam detection operation related to beam sweeping performed by the beam sweeping unit 2061 of the terminal apparatus 2. The beam detection operation performed by the base station apparatus 1 is the same as the beam detection operation performed by the terminal apparatus 2 on the antenna directivity pattern of the antenna 105 of the base station apparatus 1. Like the relationship between the beam sweeping unit 2061 and the beam sweeping unit 1061, for example, a method in the present embodiment includes a case where the number of antenna directivity patterns on which beam sweeping can be performed in a prescribed time period is different between the beam sweeping operation of the base station apparatus 1 and the beam sweeping operation of the terminal apparatus 1.

In a case that the information, notified from the base station apparatus 1, for indicating the frame configuration indicates a prescribed frame configuration, the beam sweeping unit 2061 can perform beam sweeping on a plurality of antenna directivity patterns that can be configured by the antenna 206. The terminal apparatus 2 can acquire the information for indicating the prescribed frame configuration from the base station apparatus 1.

The beam sweeping unit 2061 can perform beam sweeping within a prescribed time period. The terminal apparatus 2 can acquire the information for indicating the length and the start time of the prescribed time period from the base station apparatus 1. The number of beam patterns on which the beam sweeping unit 2061 can perform beam sweeping within the prescribed time period may be configured based on the frame configuration indicated by the information for indicating the frame configuration notified from the base station apparatus 1.

In a case that the frame configuration configured for the terminal apparatus 2 is a prescribed frame configuration, the base station apparatus 1 can perform a beam detection operation on the antenna directivity pattern configured by the antenna 206 of the terminal apparatus 2. The beam detecting operation includes an operation in which the base station apparatus 1 transmits a reference signal in a prescribed radio resource to the terminal apparatus 2 and an operation in which the base station apparatus 1 measures the reception quality of the signals transmitted, by the terminal apparatus 2, with different antenna directivity patterns in different radio resources, and notifies the result of the measurement to the terminal apparatus 2.

The base station apparatus 1 can notify the terminal apparatus 2 of information for indicating a prescribed frame configuration in which the base station apparatus 1 performs beam detection operation. The base station apparatus 1 can perform signaling of the prescribed frame configuration in the physical layer and can also perform a notification by using the higher layer signaling such as RRC signaling.

The base station apparatus 1 can perform a beam detection for each of a plurality of frame configurations configured in the terminal apparatus 2.

According to the above-described method, the base station apparatus 1 and the terminal apparatus 2, in which a plurality of frame configurations may be configured, can appropriately configure the antenna directivity patterns of the respective antennas, thus allowing the communication quality to be significantly improved.

2. All Embodiments

It should be noted that the base station apparatus and the terminal apparatus according to the present invention can be used for not only radio access technology (RAT) operated in a license band but also RAT operated in an unlicensed band. Also, the RAT operated in the unlicensed band can be a licensed assisted access that can be assisted by the license band.

In addition, the base station apparatus and the terminal apparatus according to the present invention can be used in dual connectivity (DC) in which signals are transmitted (or received) from a plurality of transmission points (or a plurality of reception points). The base station apparatus and the terminal apparatus can be used for a communication with at least one of a plurality of transmission points (or reception points) connected in the DC. Further, the base station apparatus and the terminal apparatus according to the present invention can be used in carrier aggregation (CA) in which a plurality of component carriers (CC) are used. The base station apparatus and the terminal apparatus can be used, among the plurality of CCs in the CA, for only the primary cell, for only the secondary cell, or for both the primary cell and the secondary cell.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or other storage system.

Note that a program for realizing the functions of the embodiments according to the present invention may be recorded in a computer readable recording medium. The functions of the embodiments according to the present invention may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium for retaining a program dynamically in a short time period, or other computer readable recording media.

Furthermore, each functional block or various characteristics of the apparatuses used in the above-described embodiment may be implemented or performed on an electric circuit, for example, an integrated circuit or multiple integrated circuits. Electric circuits designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. Although the general-purpose processor may be a microprocessor, the general-purpose processor may also be a conventional processor, a controller, a micro-controller, or a state machine instead. The above-described circuits may be constituted of a digital circuit, or may be constituted of an analog circuit. Furthermore, in a case that with advances in semiconductor technology, a circuit integration technology appears that replaces the present integrated circuits, a new integrated circuit based on the circuit integration technology may be used in one or more of aspects of the present invention.

Note that an aspect of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-133248 filed on Jul. 5, 2016, and all the contents of JP 2016-133248 are incorporated in the present international application by reference.

REFERENCE SIGNS LIST 1, 1A, 1B Base station apparatus
2, 2A, 2B Terminal apparatus
101 Higher layer processing unit
1011 Radio resource control unit
1012 Scheduling unit
102 Controller
103 Transmitter
1031 Coding unit
1032 Modulation unit
1033, 2033 Frame configuration unit
1034 Multiplexing unit
1035 Radio transmission unit
104 Receiver
1041 Radio reception unit
1042 Demultiplexing unit
1043 Demodulation unit
1044 Decoding unit
105 Antenna unit
1051 Orthogonal modulating unit
1052 Distribution unit
1053, 1053-1 to N transmission variable phase shifter
1054, 1054-1 to N amplifier
1055, 1055-1 to N transmission antenna elements
1056, 1056-1 to N reception antenna elements
1057, 1057-1 to N low noise amplifier
1058, 1058-1 to N reception variable phase shifter
1059 Composite part
1050 Orthogonal detection unit
1061, 2061 beam sweeping unit
201 Higher layer processing unit
202 Controller
203 Transmitter
204 Receiver
205 Channel state information generating unit
206 Antenna unit
2011 Radio resource control unit
2012 Scheduling information interpretation unit
2031 Coding unit
2032 Modulation unit
2034 Multiplexing unit
2035 Radio transmission unit
2041 Radio reception unit
2042 Demultiplexing unit
2043 Signal detection unit
2044 Frame Interpretation Unit
4000 to 4007 Resources
5000 Subframe

The invention claimed is:

1. A base station apparatus configured to communicate with a terminal apparatus, the base station apparatus comprising:
transmission circuitry configured to transmit a plurality of signals each including a synchronization signal, the plurality of signals being mapped to a plurality of orthogonal frequency division multiplexing (OFDM) symbols, each of OFDM symbols including a plurality of subcarriers, and
higher layer processing circuitry configured to transmit first higher layer information indicating spacing between the plurality of subcarriers, wherein
the transmission circuitry is configured to transmit the plurality of signals each including the synchronization signal using a plurality of resources, a quantity of the plurality of resources within a specific duration being determined based on the spacing between the plurality of subcarriers.

2. The base station apparatus according to claim 1, wherein
the higher layer processing circuitry is configured to transmit second higher layer information indicating a periodicity of frames for the plurality of resources which are used for transmitting the plurality of signals.

3. A terminal apparatus configured to communicate with a base station apparatus, the terminal apparatus comprising:
reception circuitry configured to receive a plurality of signals each including a synchronization signal, the plurality of signals being mapped to a plurality of orthogonal frequency division multiplexing (OFDM) symbols, each of OFDM symbols including a plurality of subcarriers, and
higher layer processing circuitry configured to receive first higher layer information indicating spacing between the plurality of subcarriers, wherein
the reception circuitry is configured to receive the plurality of signals each including the synchronization signal using a plurality of resources, a quantity of the plurality of resources within a specific duration being determined based on the spacing between the plurality of subcarriers.

4. The terminal apparatus according to claim 3, wherein
the higher layer processing circuitry is configured to receive second higher layer information indicating a periodicity of frames for the plurality of resources which are used for transmitting the plurality of signals.

5. A communication method for a base station apparatus configured to communicate with a terminal apparatus, the communication method comprising:
transmitting a plurality of signals each including a synchronization signal, the plurality of signals being mapped to a plurality of orthogonal frequency division multiplexing (OFDM) symbols, each of OFDM symbols including a plurality of subcarriers, and
transmitting first higher layer information indicating spacing between the plurality of subcarriers, wherein
the plurality of signals each including the synchronization signal are transmitted using a plurality of resources, a quantity of the plurality of resources within a specific duration being determined based on the spacing between the plurality of subcarriers.

6. A communication method for a terminal apparatus configured to communicate with a base station apparatus, the communication method comprising:
- receiving a plurality of signals each including a synchronization signal, the plurality of signals being mapped to a plurality of orthogonal frequency division multiplexing (OFDM) symbols, each of OFDM symbols including a plurality of subcarriers, and
- receiving first higher layer information indicating spacing between the plurality of subcarriers, wherein
- the plurality of signals each including the synchronization signal are received using a plurality of resources, a quantity of the plurality of resources within a specific duration determined based on the spacing between the plurality of subcarriers.

* * * * *